(12) United States Patent
High et al.

(10) Patent No.: US 10,351,399 B2
(45) Date of Patent: *Jul. 16, 2019

(54) SYSTEMS, DEVICES AND METHODS OF CONTROLLING MOTORIZED TRANSPORT UNITS IN FULFILLING PRODUCT ORDERS

(71) Applicant: Walmart Apollo, LLC, Bentonville, AR (US)

(72) Inventors: Donald R. High, Noel, MO (US); Shuvro Chakrobartty, Bentonville, AR (US); David C. Winkle, Bella Vista, AR (US); Robert C. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/894,155

(22) Filed: Feb. 12, 2018

(65) Prior Publication Data

US 2018/0170730 A1 Jun. 21, 2018

Related U.S. Application Data

(63) Continuation of application No. 15/061,402, filed on Mar. 4, 2016, now Pat. No. 9,896,315.

(Continued)

(51) Int. Cl.
*G05D 1/02* (2006.01)
*B66F 9/06* (2006.01)
(Continued)

(52) U.S. Cl.
CPC ............... *B66F 9/063* (2013.01); *A47F 3/08* (2013.01); *A47F 10/04* (2013.01); *A47F 13/00* (2013.01);
(Continued)

(58) Field of Classification Search
CPC ......... G05D 2201/0216; G05D 1/0011; G05D 1/0022; G05D 1/0088; G05D 1/0297;
(Continued)

(56) References Cited

U.S. PATENT DOCUMENTS 1,001,732 A 8/1911 Cummings
1,774,653 A 9/1930 Marriott
(Continued)

FOREIGN PATENT DOCUMENTS

CA 2524037 5/2006
CA 2625885 4/2007
(Continued)

OTHER PUBLICATIONS

U.S. Appl. No. 15/061,443, filed Mar. 4, 2016, High.
(Continued)

*Primary Examiner* — Dalena Tran
(74) *Attorney, Agent, or Firm* — Fitch, Even, Tabin & Flannery LLP

(57) ABSTRACT

Some embodiments include apparatuses to fulfill customer orders comprising a motorized transport unit; a product pick unit (PPU) that cooperate with the motorized transport unit; a wireless communication network; and a central computer system configured to communicate with the multiple motorized transport units and the plurality of product pick units, and comprises a control circuit and memory storing instructions executed to cause the control circuit to: communicate an instruction to the motorized transport unit and direct the motorized transport unit to transport the product pick unit to a determined first location within the shopping facility proximate to where a first product having been ordered is located; and communicate an instruction to the product pick unit cooperated with the motorized transport unit and direct the product pick unit to retrieve the first product.

20 Claims, 10 Drawing Sheets

Related U.S. Application Data

(60) Provisional application No. 62/303,021, filed on Mar. 3, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/292,084, filed on Feb. 5, 2016, provisional application No. 62/214,826, filed on Sep. 4, 2015, provisional application No. 62/214,824, filed on Sep. 4, 2015, provisional application No. 62/207,858, filed on Aug. 20, 2015, provisional application No. 62/205,539, filed on Aug. 14, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/202,744, filed on Aug. 7, 2015, provisional application No. 62/202,747, filed on Aug. 7, 2015, provisional application No. 62/194,131, filed on Jul. 17, 2015, provisional application No. 62/194,127, filed on Jul. 17, 2015, provisional application No. 62/194,121, filed on Jul. 17, 2015, provisional application No. 62/194,119, filed on Jul. 17, 2015, provisional application No. 62/185,478, filed on Jun. 26, 2015, provisional application No. 62/182,339, filed on Jun. 19, 2015, provisional application No. 62/175,182, filed on Jun. 12, 2015, provisional application No. 62/171,822, filed on Jun. 5, 2015, provisional application No. 62/165,416, filed on May 22, 2015, provisional application No. 62/165,579, filed on May 22, 2015, provisional application No. 62/165,586, filed on May 22, 2015, provisional application No. 62/157,388, filed on May 5, 2015, provisional application No. 62/152,421, filed on Apr. 24, 2015, provisional application No. 62/152,440, filed on Apr. 24, 2015, provisional application No. 62/152,465, filed on Apr. 24, 2015, provisional application No. 62/152,610, filed on Apr. 24, 2015, provisional application No. 62/152,667, filed on Apr. 24, 2015, provisional application No. 62/152,711, filed on Apr. 24, 2015, provisional application No. 62/152,630, filed on Apr. 24, 2015, provisional application No. 62/138,877, filed on Mar. 26, 2015, provisional application No. 62/138,885, filed on Mar. 26, 2015, provisional application No. 62/129,727, filed on Mar. 6, 2015, provisional application No. 62/129,726, filed on Mar. 6, 2015.

(51) Int. Cl.

| | | |
|---|---|---|
| *G01C 21/20* | (2006.01) | |
| *G06Q 30/06* | (2012.01) | |
| *A47F 10/04* | (2006.01) | |
| *H04W 4/80* | (2018.01) | |
| *G06Q 10/06* | (2012.01) | |
| *G06Q 10/02* | (2012.01) | |
| *G06Q 50/30* | (2012.01) | |
| *G06Q 10/08* | (2012.01) | |
| *B62B 5/00* | (2006.01) | |
| *G06Q 30/02* | (2012.01) | |
| *H04W 4/04* | (2009.01) | |
| *B60P 3/06* | (2006.01) | |
| *G05D 1/00* | (2006.01) | |
| *A47F 3/08* | (2006.01) | |
| *G06Q 30/00* | (2012.01) | |
| *H04N 5/77* | (2006.01) | |
| *G06Q 50/28* | (2012.01) | |
| *H04N 7/18* | (2006.01) | |
| *E01H 5/06* | (2006.01) | |
| *E01H 5/12* | (2006.01) | |
| *G06Q 10/00* | (2012.01) | |
| *G06Q 10/10* | (2012.01) | |
| *H04W 4/33* | (2018.01) | |
| *G06T 7/73* | (2017.01) | |
| *G06T 7/593* | (2017.01) | |
| *H04N 13/282* | (2018.01) | |
| *A47L 11/40* | (2006.01) | |
| *G05D 1/04* | (2006.01) | |
| *G06K 9/00* | (2006.01) | |
| *G06K 9/18* | (2006.01) | |
| *G06K 9/32* | (2006.01) | |
| *G06K 9/62* | (2006.01) | |
| *G06K 9/78* | (2006.01) | |
| *G08G 1/00* | (2006.01) | |
| *G10L 13/04* | (2013.01) | |
| *G10L 15/22* | (2006.01) | |
| *G10L 17/22* | (2013.01) | |
| *H02J 7/00* | (2006.01) | |
| *H04B 10/116* | (2013.01) | |
| *H04L 29/08* | (2006.01) | |
| *H04W 4/30* | (2018.01) | |
| *A47F 13/00* | (2006.01) | |
| *B07C 5/28* | (2006.01) | |
| *B07C 5/342* | (2006.01) | |
| *B65F 3/00* | (2006.01) | |
| *G05B 19/048* | (2006.01) | |
| *G06F 3/01* | (2006.01) | |
| *H04W 4/02* | (2018.01) | |
| *H04W 4/40* | (2018.01) | |
| *B60L 53/36* | (2019.01) | |
| *B60L 53/63* | (2019.01) | |
| *G06F 21/60* | (2013.01) | |
| *H04L 29/06* | (2006.01) | |
| *G06Q 20/12* | (2012.01) | |
| *G06F 16/903* | (2019.01) | |
| *A47F 10/02* | (2006.01) | |
| *H04B 1/38* | (2015.01) | |
| *A47F 10/00* | (2006.01) | |
| *G05B 19/12* | (2006.01) | |

(52) U.S. Cl.
CPC .............. *A47L 11/4011* (2013.01); *B07C 5/28* (2013.01); *B07C 5/3422* (2013.01); *B60L 53/36* (2019.02); *B60L 53/63* (2019.02); *B60P 3/06* (2013.01); *B62B 5/0026* (2013.01); *B62B 5/0069* (2013.01); *B62B 5/0076* (2013.01); *B65F 3/00* (2013.01); *E01H 5/061* (2013.01); *E01H 5/12* (2013.01); *G01C 21/206* (2013.01); *G05B 19/048* (2013.01); *G05D 1/0011* (2013.01); *G05D 1/0016* (2013.01); *G05D 1/0022* (2013.01); *G05D 1/0027* (2013.01); *G05D 1/0061* (2013.01); *G05D 1/0088* (2013.01); *G05D 1/021* (2013.01); *G05D 1/028* (2013.01); *G05D 1/0214* (2013.01); *G05D 1/0219* (2013.01); *G05D 1/0234* (2013.01); *G05D 1/0246* (2013.01); *G05D 1/0255* (2013.01); *G05D 1/0276* (2013.01); *G05D 1/0289* (2013.01); *G05D 1/0291* (2013.01); *G05D 1/0293* (2013.01); *G05D 1/0297* (2013.01); *G05D 1/04* (2013.01); *G06F 3/017* (2013.01); *G06K*

9/00208 (2013.01); *G06K 9/00671* (2013.01);
*G06K 9/00711* (2013.01); *G06K 9/00771*
(2013.01); *G06K 9/00791* (2013.01); *G06K
9/00805* (2013.01); *G06K 9/18* (2013.01);
*G06K 9/3208* (2013.01); *G06K 9/6256*
(2013.01); *G06K 9/78* (2013.01); *G06Q 10/02*
(2013.01); *G06Q 10/0631* (2013.01); *G06Q
10/06311* (2013.01); *G06Q 10/083* (2013.01);
*G06Q 10/087* (2013.01); *G06Q 10/1095*
(2013.01); *G06Q 10/30* (2013.01); *G06Q
30/016* (2013.01); *G06Q 30/0281* (2013.01);
*G06Q 30/0601* (2013.01); *G06Q 30/0605*
(2013.01); *G06Q 30/0613* (2013.01); *G06Q
30/0617* (2013.01); *G06Q 30/0619* (2013.01);
*G06Q 30/0631* (2013.01); *G06Q 30/0633*
(2013.01); *G06Q 30/0635* (2013.01); *G06Q
30/0639* (2013.01); *G06Q 30/0641* (2013.01);
*G06Q 50/28* (2013.01); *G06Q 50/30*
(2013.01); *G06T 7/593* (2017.01); *G06T 7/74*
(2017.01); *G08G 1/20* (2013.01); *G10L
13/043* (2013.01); *G10L 15/22* (2013.01);
*G10L 17/22* (2013.01); *H02J 7/0027*
(2013.01); *H04B 10/116* (2013.01); *H04L
67/12* (2013.01); *H04L 67/141* (2013.01);
*H04L 67/143* (2013.01); *H04N 5/77*
(2013.01); *H04N 7/18* (2013.01); *H04N 7/183*
(2013.01); *H04N 7/185* (2013.01); *H04N
13/282* (2018.05); *H04W 4/02* (2013.01);
*H04W 4/043* (2013.01); *H04W 4/30*
(2018.02); *H04W 4/33* (2018.02); *H04W 4/40*
(2018.02); *H04W 4/80* (2018.02); *A47F
2010/005* (2013.01); *A47F 2010/025*
(2013.01); *A47L 2201/04* (2013.01); *B07C
2501/0045* (2013.01); *B07C 2501/0054*
(2013.01); *B07C 2501/0063* (2013.01); *B60Y
2410/10* (2013.01); *B65F 2210/168* (2013.01);
*G05B 19/124* (2013.01); *G05B 2219/23363*
(2013.01); *G05B 2219/39107* (2013.01); *G05D
2201/0203* (2013.01); *G05D 2201/0216*
(2013.01); *G06F 16/90335* (2019.01); *G06F
21/606* (2013.01); *G06K 9/00624* (2013.01);
*G06K 2009/00738* (2013.01); *G06Q 10/06315*
(2013.01); *G06Q 20/12* (2013.01); *G06T
2207/10028* (2013.01); *G10L 2015/223*
(2013.01); *H02J 2007/0096* (2013.01); *H04B
1/38* (2013.01); *H04L 63/06* (2013.01); *H04L
63/08* (2013.01); *H04L 63/0846* (2013.01);
*Y02W 30/82* (2015.05); *Y02W 30/827*
(2015.05); *Y02W 90/20* (2015.05); *Y10S
901/01* (2013.01)

(58) Field of Classification Search
CPC .............. G06Q 30/0635; G06Q 50/28; G06Q
10/06311; G06Q 10/06315; G06Q
10/083; G06Q 10/087; G05B 19/048;
G05B 2219/23363; G05B 2219/39107;
G05B 2219/31002
USPC .............. 701/2; 700/245; 180/168; 318/587;
244/3.11; 414/265, 909
See application file for complete search history.

(56) References Cited

U.S. PATENT DOCUMENTS

| | | |
|---|---|---|
| 2,669,345 A | 2/1954 | Brown |
| 3,765,546 A | 10/1973 | Westerling |
| 4,071,740 A | 1/1978 | Gogulski |
| 4,158,416 A | 6/1979 | Podesta |
| 4,588,349 A | 5/1986 | Reuter |
| 4,672,280 A | 6/1987 | Honjo |
| 4,777,416 A | 10/1988 | George |
| 4,791,482 A | 12/1988 | Barry |
| 4,868,544 A | 9/1989 | Havens |
| 4,911,608 A | 3/1990 | Krappitz |
| 5,119,087 A | 6/1992 | Lucas |
| 5,279,672 A | 1/1994 | Betker |
| 5,287,266 A | 2/1994 | Malec |
| 5,295,551 A | 3/1994 | Sukonick |
| 5,363,305 A | 11/1994 | Cox |
| 5,380,138 A | 1/1995 | Kasai |
| 5,384,450 A | 1/1995 | Goetz, Jr. |
| 5,395,206 A | 3/1995 | Cerny, Jr. |
| 5,402,051 A | 3/1995 | Fujiwara |
| 5,548,515 A | 8/1996 | Pilley |
| 5,632,381 A | 5/1997 | Thust |
| 5,652,489 A | 7/1997 | Kawakami |
| 5,671,362 A | 9/1997 | Cowe |
| 5,777,571 A | 7/1998 | Chuang |
| 5,801,340 A | 9/1998 | Peter |
| 5,917,174 A | 6/1999 | Moore |
| 5,920,261 A | 7/1999 | Hughes |
| 5,969,317 A | 10/1999 | Espy |
| 6,018,397 A | 1/2000 | Cloutier |
| 6,199,753 B1 | 3/2001 | Tracy |
| 6,201,203 B1 | 3/2001 | Tilles |
| 6,240,342 B1 | 5/2001 | Fiegert |
| 6,339,735 B1 | 1/2002 | Peless |
| 6,365,857 B1 | 4/2002 | Maehata |
| 6,374,155 B1 | 4/2002 | Wallach |
| 6,394,519 B1 | 5/2002 | Byers |
| 6,431,078 B2 | 8/2002 | Serrano |
| 6,522,952 B1 | 2/2003 | Arai |
| 6,525,509 B1 | 2/2003 | Petersson |
| 6,535,793 B2 | 3/2003 | Allard |
| 6,550,672 B1 | 4/2003 | Tracy |
| 6,571,693 B1 | 6/2003 | Kaldenberg |
| 6,584,375 B2 | 6/2003 | Bancroft |
| 6,584,376 B1 | 6/2003 | VanKommer |
| 6,600,418 B2 | 7/2003 | Francis |
| 6,601,759 B2 | 8/2003 | Fife |
| 6,606,411 B1 | 8/2003 | Loui |
| 6,626,632 B2 | 9/2003 | Guenzi |
| 6,633,800 B1 | 10/2003 | Ward |
| 6,655,897 B1 | 12/2003 | Harwell |
| 6,667,592 B2 | 12/2003 | Jacobs |
| 6,672,601 B1 | 1/2004 | Hofheins |
| 6,678,583 B2 | 1/2004 | Nasr |
| 6,688,435 B1 | 2/2004 | Will |
| 6,728,597 B2 | 4/2004 | Didriksen |
| 6,731,204 B2 | 5/2004 | Lehmann |
| 6,745,186 B1 | 6/2004 | Testa |
| 6,752,582 B2 | 6/2004 | Garcia |
| 6,810,149 B1 | 10/2004 | Squilla |
| 6,816,085 B1 | 11/2004 | Haynes |
| 6,832,884 B2 | 12/2004 | Robinson |
| 6,841,963 B2 | 1/2005 | Song |
| 6,850,899 B1 | 2/2005 | Chow |
| 6,883,201 B2 | 4/2005 | Jones |
| 6,885,736 B2 | 4/2005 | Uppaluru |
| 6,886,101 B2 | 4/2005 | Glazer |
| 6,895,301 B2 | 5/2005 | Mountz |
| 6,910,828 B1 | 6/2005 | Hughes |
| 6,937,989 B2 | 8/2005 | McIntyre |
| 6,954,695 B2 | 10/2005 | Bonilla |
| 6,967,455 B2 | 11/2005 | Nakadai |
| 6,975,997 B1 | 12/2005 | Murakami |
| 7,039,499 B1 | 5/2006 | Nasr |
| 7,066,291 B2 | 6/2006 | Martins |
| 7,101,113 B2 | 9/2006 | Hughes |
| 7,101,139 B1 | 9/2006 | Benedict |
| 7,117,902 B2 | 10/2006 | Osborne |
| 7,145,562 B2 | 12/2006 | Schechter |
| 7,147,154 B2 | 12/2006 | Myers |
| 7,177,820 B2 | 2/2007 | McIntyre |
| 7,184,586 B2 | 2/2007 | Jeon |

(56) References Cited

U.S. PATENT DOCUMENTS

| | | |
|---|---|---|
| 7,205,016 B2 | 4/2007 | Garwood |
| 7,206,753 B2 | 4/2007 | Bancroft |
| 7,222,363 B2 | 5/2007 | Rice |
| 7,233,241 B2 | 6/2007 | Overhultz |
| 7,234,609 B2 | 6/2007 | DeLazzer |
| 7,261,511 B2 | 8/2007 | Felder |
| 7,367,245 B2 | 5/2008 | Okazaki |
| 7,381,022 B1 | 6/2008 | King |
| 7,402,018 B2 | 7/2008 | Mountz |
| 7,431,208 B2 | 10/2008 | Feldman et al. |
| 7,447,564 B2 | 11/2008 | Yasukawa |
| 7,463,147 B1 | 12/2008 | Laffoon |
| 7,474,945 B2 | 1/2009 | Matsunaga |
| 7,487,913 B2 | 2/2009 | Adema |
| 7,533,029 B2 | 5/2009 | Mallett |
| 7,554,282 B2 | 6/2009 | Nakamoto |
| 7,556,108 B2 | 7/2009 | Won |
| 7,556,219 B2 | 7/2009 | Page |
| 7,587,756 B2 | 9/2009 | Peart |
| 7,613,544 B2 | 11/2009 | Park |
| 7,627,515 B2 | 12/2009 | Borgs |
| 7,636,045 B2 | 12/2009 | Sugiyama |
| 7,648,068 B2 | 1/2010 | Silverbrook |
| 7,653,603 B1 | 1/2010 | Holtkamp, Jr. |
| 7,658,327 B2 | 2/2010 | Tuchman |
| 7,689,322 B2 | 3/2010 | Tanaka |
| 7,693,605 B2 | 4/2010 | Park |
| 7,693,745 B1 | 4/2010 | Pomerantz |
| 7,693,757 B2 | 4/2010 | Zimmerman |
| 7,706,917 B1 | 4/2010 | Chiappetta |
| 7,716,064 B2 | 5/2010 | McIntyre |
| 7,726,563 B2 | 6/2010 | Scott |
| 7,762,458 B2 | 7/2010 | Stawar |
| 7,783,527 B2 | 8/2010 | Bonner |
| 7,787,985 B2 | 8/2010 | Tsujimoto |
| 7,817,394 B2 | 10/2010 | Mukherjee |
| 7,826,919 B2 | 11/2010 | DAndrea |
| 7,835,281 B2 | 11/2010 | Lee |
| 7,894,932 B2 | 2/2011 | Mountz |
| 7,894,939 B2 | 2/2011 | Zini |
| 7,957,837 B2 | 6/2011 | Ziegler |
| 7,969,297 B2 | 6/2011 | Haartsen |
| 7,996,109 B2 | 8/2011 | Zini |
| 8,010,230 B2 | 8/2011 | Zini |
| 8,032,249 B1 | 10/2011 | Shakes |
| 8,041,455 B2 | 10/2011 | Thorne |
| 8,050,976 B2 | 11/2011 | Staib |
| 8,065,032 B2 | 11/2011 | Stiffer |
| 8,065,353 B2 | 11/2011 | Eckhoff-Hornback |
| 8,069,092 B2 | 11/2011 | Bryant |
| 8,083,013 B2 | 12/2011 | Bewley |
| 8,099,191 B2 | 1/2012 | Blanc |
| 8,103,398 B2 | 1/2012 | Duggan |
| 8,195,333 B2 | 6/2012 | Ziegler |
| 8,239,276 B2 | 8/2012 | Lin |
| 8,244,041 B1 | 8/2012 | Silver |
| 8,248,467 B1 | 8/2012 | Ganick |
| 8,260,456 B2 | 9/2012 | Siegel |
| 8,284,240 B2 | 10/2012 | Saint-Pierre |
| 8,295,542 B2 | 10/2012 | Albertson |
| 8,321,303 B1 | 11/2012 | Krishnamurthy |
| 8,325,036 B1 | 12/2012 | Fuhr |
| 8,342,467 B2 | 1/2013 | Stachowski |
| 8,352,110 B1 | 1/2013 | Szybalski |
| 8,359,122 B2 | 1/2013 | Koselka |
| 8,380,349 B1 | 2/2013 | Hickman |
| 8,393,846 B1 | 3/2013 | Coots |
| 8,412,400 B2 | 4/2013 | DAndrea |
| 8,423,280 B2 | 4/2013 | Edwards |
| 8,425,173 B2 | 4/2013 | Lert |
| 8,429,004 B2 | 4/2013 | Hamilton |
| 8,430,192 B2 | 4/2013 | Gillett |
| 8,433,470 B1 | 4/2013 | Szybalski |
| 8,433,507 B2 | 4/2013 | Hannah |
| 8,437,875 B2 | 5/2013 | Hernandez |
| 8,444,369 B2 | 5/2013 | Watt |
| 8,447,863 B1 | 5/2013 | Francis, Jr. |
| 8,452,450 B2 | 5/2013 | Dooley |
| 8,474,090 B2 | 7/2013 | Jones |
| 8,494,908 B2 | 7/2013 | Herwig |
| 8,504,202 B2 | 8/2013 | Ichinose |
| 8,508,590 B2 | 8/2013 | Laws |
| 8,510,033 B2 | 8/2013 | Park |
| 8,511,606 B1 | 8/2013 | Lutke |
| 8,515,580 B2 | 8/2013 | Taylor |
| 8,516,651 B2 | 8/2013 | Jones |
| 8,538,577 B2 | 9/2013 | Bell |
| 8,544,858 B2 | 10/2013 | Eberlein |
| 8,571,700 B2 | 10/2013 | Keller |
| 8,572,712 B2 | 10/2013 | Rice |
| 8,577,538 B2 | 11/2013 | Lenser |
| 8,587,662 B1 | 11/2013 | Moll |
| 8,588,969 B2 | 11/2013 | Frazier |
| 8,594,834 B1 | 11/2013 | Clark |
| 8,606,314 B2 | 12/2013 | Barnes, Jr. |
| 8,606,392 B2 | 12/2013 | Wurman |
| 8,639,382 B1 | 1/2014 | Clark |
| 8,645,223 B2 | 2/2014 | Ouimet |
| 8,649,557 B2 | 2/2014 | Hyung |
| 8,656,550 B2 | 2/2014 | Jones |
| 8,670,866 B2 | 3/2014 | Ziegler |
| 8,671,507 B2 | 3/2014 | Jones |
| 8,676,377 B2 | 3/2014 | Siegel |
| 8,676,420 B2 | 3/2014 | Kume |
| 8,676,480 B2 | 3/2014 | Lynch |
| 8,700,230 B1 | 4/2014 | Hannah |
| 8,708,285 B1 | 4/2014 | Carreiro |
| 8,718,814 B1 | 5/2014 | Clark |
| 8,724,282 B2 | 5/2014 | Hiremath |
| 8,732,039 B1 | 5/2014 | Chen |
| 8,744,626 B2 | 6/2014 | Johnson |
| 8,751,042 B2 | 6/2014 | Lee |
| 8,763,199 B2 | 7/2014 | Jones |
| 8,770,976 B2 | 7/2014 | Moser |
| 8,775,064 B2 | 7/2014 | Zeng |
| 8,798,786 B2 | 8/2014 | Wurman |
| 8,798,840 B2 | 8/2014 | Fong |
| 8,814,039 B2 | 8/2014 | Bishop |
| 8,818,556 B2 | 8/2014 | Sanchez |
| 8,820,633 B2 | 9/2014 | Bishop |
| 8,825,226 B1 | 9/2014 | Worley, III |
| 8,831,984 B2 | 9/2014 | Hoffman |
| 8,838,268 B2 | 9/2014 | Friedman |
| 8,843,244 B2 | 9/2014 | Phillips |
| 8,851,369 B2 | 10/2014 | Bishop |
| 8,882,432 B2 | 11/2014 | Bastian |
| 8,886,390 B2 | 11/2014 | Wolfe |
| 8,892,240 B1 | 11/2014 | Vliet |
| 8,892,241 B2 | 11/2014 | Weiss |
| 8,899,903 B1 | 12/2014 | Saad |
| 8,918,202 B2 | 12/2014 | Kawano |
| 8,918,230 B2 | 12/2014 | Chen |
| 8,930,044 B1 | 1/2015 | Peeters |
| 8,965,561 B2 | 2/2015 | Jacobus |
| 8,972,045 B1 | 3/2015 | Mountz |
| 8,972,061 B2 | 3/2015 | Rosenstein |
| 8,983,647 B1 | 3/2015 | Dwarakanath |
| 8,989,053 B1 | 3/2015 | Skaaksrud |
| 9,002,506 B1 | 4/2015 | Agarwal |
| 9,008,827 B1 | 4/2015 | Dwarakanath |
| 9,008,829 B2 | 4/2015 | Worsley |
| 9,014,848 B2 | 4/2015 | Farlow |
| 9,075,136 B1 | 7/2015 | Joao |
| 9,129,277 B2 | 9/2015 | MacIntosh |
| 9,170,117 B1 | 10/2015 | Abuelsaad |
| 9,173,816 B2 | 11/2015 | Reinhardt |
| 9,190,304 B2 | 11/2015 | MacKnight |
| 9,278,839 B2 | 3/2016 | Gilbride |
| 9,305,280 B1 | 4/2016 | Berg |
| 9,329,597 B2 | 5/2016 | Stoschek |
| 9,495,703 B1 | 11/2016 | Kaye, III |
| 9,534,906 B2 | 1/2017 | High |
| 9,550,577 B1 | 1/2017 | Beckman |
| 9,573,684 B2 | 2/2017 | Kimchi |

(56) References Cited

U.S. PATENT DOCUMENTS

| | | |
|---|---|---|
| 9,578,282 B1 | 2/2017 | Sills |
| 9,607,285 B1 | 3/2017 | Wellman |
| 9,623,923 B2 | 4/2017 | Riedel |
| 9,649,766 B2 | 5/2017 | Stubbs |
| 9,656,805 B1 | 5/2017 | Evans |
| 9,658,622 B2 | 5/2017 | Walton |
| 9,663,292 B1 | 5/2017 | Brazeau |
| 9,663,293 B2 | 5/2017 | Wurman |
| 9,663,295 B1 | 5/2017 | Wurman |
| 9,663,296 B1 | 5/2017 | Dingle |
| 9,747,480 B2 | 8/2017 | McAllister |
| 9,757,002 B2 | 9/2017 | Thompson |
| 9,796,093 B2 | 10/2017 | Mascorro Medina |
| 9,801,517 B2 | 10/2017 | High |
| 9,827,678 B1 | 11/2017 | Gilbertson |
| 9,875,502 B2 | 1/2018 | Kay |
| 9,875,503 B2 | 1/2018 | High |
| 9,896,315 B2 | 3/2018 | High |
| 9,908,760 B2 | 3/2018 | High |
| 9,948,917 B2 | 4/2018 | Inacio De Matos |
| 9,994,434 B2 | 6/2018 | High |
| 10,017,322 B2 | 7/2018 | High et al. |
| 10,071,891 B2 | 9/2018 | High |
| 10,071,892 B2 | 9/2018 | High |
| 10,071,893 B2 | 9/2018 | High |
| 10,081,525 B2 | 9/2018 | High |
| 2001/0042024 A1 | 11/2001 | Rogers |
| 2002/0060542 A1 | 5/2002 | Song |
| 2002/0095342 A1 | 7/2002 | Feldman |
| 2002/0154974 A1 | 10/2002 | Fukuda |
| 2002/0156551 A1 | 10/2002 | Tackett |
| 2002/0165638 A1 | 11/2002 | Bancroft |
| 2002/0165643 A1 | 11/2002 | Bancroft |
| 2002/0165790 A1 | 11/2002 | Bancroft |
| 2002/0170961 A1 | 11/2002 | Dickson |
| 2002/0174021 A1 | 11/2002 | Chu |
| 2003/0028284 A1 | 2/2003 | Chirnomas |
| 2003/0152679 A1 | 8/2003 | Garwood |
| 2003/0170357 A1 | 9/2003 | Garwood |
| 2003/0185948 A1 | 10/2003 | Garwood |
| 2003/0222798 A1 | 12/2003 | Floros |
| 2004/0068348 A1 | 4/2004 | Jager |
| 2004/0081729 A1 | 4/2004 | Garwood |
| 2004/0093650 A1 | 5/2004 | Martins |
| 2004/0098167 A1 | 5/2004 | Yi |
| 2004/0117063 A1 | 6/2004 | Sabe |
| 2004/0146602 A1 | 7/2004 | Garwood |
| 2004/0216339 A1 | 11/2004 | Garberg |
| 2004/0217166 A1 | 11/2004 | Myers |
| 2004/0221790 A1 | 11/2004 | Sinclair |
| 2004/0225613 A1 | 11/2004 | Narayanaswami |
| 2004/0249497 A1 | 12/2004 | Saigh |
| 2005/0008463 A1 | 1/2005 | Stehr |
| 2005/0047895 A1 | 3/2005 | Lert |
| 2005/0072651 A1 | 4/2005 | Wieth |
| 2005/0080520 A1 | 4/2005 | Kline |
| 2005/0104547 A1 | 5/2005 | Wang |
| 2005/0149414 A1 | 7/2005 | Schrodt |
| 2005/0154265 A1 | 7/2005 | Miro |
| 2005/0177446 A1 | 8/2005 | Hoblit |
| 2005/0216126 A1 | 9/2005 | Koselka |
| 2005/0222712 A1 | 10/2005 | Orita |
| 2005/0230472 A1 | 10/2005 | Chang |
| 2005/0238465 A1 | 10/2005 | Razumov |
| 2006/0107067 A1 | 5/2006 | Safal |
| 2006/0147087 A1 | 7/2006 | Goncalves |
| 2006/0163350 A1 | 7/2006 | Melton |
| 2006/0178777 A1 | 8/2006 | Park |
| 2006/0206235 A1 | 9/2006 | Shakes |
| 2006/0210382 A1 | 9/2006 | Mountz |
| 2006/0220809 A1 | 10/2006 | Stigall |
| 2006/0221072 A1 | 10/2006 | Se |
| 2006/0231301 A1 | 10/2006 | Rose |
| 2006/0235570 A1 | 10/2006 | Jung |
| 2006/0241827 A1 | 10/2006 | Fukuchi |
| 2006/0244588 A1 | 11/2006 | Hannah |
| 2006/0279421 A1 | 12/2006 | French |
| 2006/0293810 A1 | 12/2006 | Nakamoto |
| 2007/0005179 A1 | 1/2007 | Mccrackin |
| 2007/0017855 A1 | 1/2007 | Pippin |
| 2007/0045018 A1 | 3/2007 | Carter |
| 2007/0061210 A1 | 3/2007 | Chen |
| 2007/0069014 A1 | 3/2007 | Heckel |
| 2007/0072662 A1 | 3/2007 | Templeman |
| 2007/0085682 A1 | 4/2007 | Murofushi |
| 2007/0125727 A1 | 6/2007 | Winkler |
| 2007/0150368 A1 | 6/2007 | Arora |
| 2007/0152057 A1 | 7/2007 | Cato |
| 2007/0222679 A1 | 9/2007 | Morris |
| 2007/0269299 A1 | 11/2007 | Ross |
| 2007/0284442 A1 | 12/2007 | Herskovitz |
| 2007/0288123 A1 | 12/2007 | D Andrea |
| 2007/0288127 A1 | 12/2007 | Haq |
| 2007/0293978 A1 | 12/2007 | Wurman |
| 2008/0011836 A1 | 1/2008 | Adema |
| 2008/0031491 A1 | 2/2008 | Ma |
| 2008/0041644 A1 | 2/2008 | Tudek |
| 2008/0042836 A1 | 2/2008 | Christopher |
| 2008/0075566 A1 | 3/2008 | Benedict |
| 2008/0075568 A1 | 3/2008 | Benedict |
| 2008/0075569 A1 | 3/2008 | Benedict |
| 2008/0077511 A1 | 3/2008 | Zimmerman |
| 2008/0105445 A1 | 5/2008 | Dayton |
| 2008/0131255 A1 | 6/2008 | Hessler |
| 2008/0140253 A1 | 6/2008 | Brown |
| 2008/0154720 A1 | 6/2008 | Gounares |
| 2008/0201227 A1 | 8/2008 | Bakewell |
| 2008/0226129 A1 | 9/2008 | Kundu |
| 2008/0267759 A1 | 10/2008 | Morency |
| 2008/0281515 A1 | 11/2008 | Ann |
| 2008/0281664 A1 | 11/2008 | Campbell |
| 2008/0294288 A1 | 11/2008 | Yamauchi |
| 2008/0306787 A1 | 12/2008 | Hamilton |
| 2008/0308630 A1 | 12/2008 | Bhogal |
| 2008/0314667 A1 | 12/2008 | Hannah |
| 2009/0074545 A1 | 3/2009 | Lert |
| 2009/0132250 A1 | 5/2009 | Chiang |
| 2009/0134572 A1 | 5/2009 | Obuchi |
| 2009/0138375 A1 | 5/2009 | Schwartz |
| 2009/0154708 A1 | 6/2009 | Kolar Sunder |
| 2009/0155033 A1 | 6/2009 | Olsen |
| 2009/0164902 A1 | 6/2009 | Cohen |
| 2009/0177323 A1 | 7/2009 | Ziegler |
| 2009/0210536 A1 | 8/2009 | Allen |
| 2009/0240571 A1 | 9/2009 | Bonner |
| 2009/0259571 A1 | 10/2009 | Ebling |
| 2009/0265193 A1 | 10/2009 | Collins |
| 2009/0269173 A1 | 10/2009 | De Leo |
| 2009/0299822 A1 | 12/2009 | Harari |
| 2009/0319399 A1 | 12/2009 | Resta |
| 2010/0025964 A1 | 2/2010 | Fisk |
| 2010/0030417 A1 | 2/2010 | Fang |
| 2010/0076959 A1 | 3/2010 | Ramani |
| 2010/0131103 A1 | 5/2010 | Herzog |
| 2010/0138281 A1 | 6/2010 | Zhang |
| 2010/0143089 A1 | 6/2010 | Hvass |
| 2010/0171826 A1 | 7/2010 | Hamilton |
| 2010/0176922 A1 | 7/2010 | Schwab |
| 2010/0211441 A1 | 8/2010 | Sprigg |
| 2010/0222925 A1 | 9/2010 | Anezaki |
| 2010/0262278 A1* | 10/2010 | Winkler ............... B65G 1/1378 700/218 |
| 2010/0268697 A1 | 10/2010 | Karlsson |
| 2010/0295847 A1 | 11/2010 | Titus |
| 2010/0299065 A1 | 11/2010 | Mays |
| 2010/0302102 A1 | 12/2010 | Desai |
| 2010/0316470 A1* | 12/2010 | Lert ..................... B65G 1/045 414/273 |
| 2010/0324773 A1 | 12/2010 | Choi |
| 2011/0010023 A1 | 1/2011 | Kunzig |
| 2011/0022201 A1 | 1/2011 | Reumerman |
| 2011/0098920 A1 | 4/2011 | Chuang |
| 2011/0153081 A1 | 6/2011 | Romanov |
| 2011/0163160 A1 | 7/2011 | Zini |

(56) References Cited

U.S. PATENT DOCUMENTS

| | | |
|---|---|---|
| 2011/0176803 A1 | 7/2011 | Song |
| 2011/0225071 A1 | 9/2011 | Sano |
| 2011/0238211 A1 | 9/2011 | Shirado |
| 2011/0240777 A1 | 10/2011 | Johns |
| 2011/0258060 A1 | 10/2011 | Sweeney |
| 2011/0260865 A1 | 10/2011 | Bergman |
| 2011/0279252 A1 | 11/2011 | Carter |
| 2011/0288684 A1 | 11/2011 | Farlow |
| 2011/0288763 A1 | 11/2011 | Hui |
| 2011/0295424 A1 | 12/2011 | Johnson |
| 2011/0301757 A1 | 12/2011 | Jones |
| 2011/0320034 A1 | 12/2011 | Dearlove |
| 2011/0320322 A1 | 12/2011 | Roslak |
| 2012/0000024 A1 | 1/2012 | Layton |
| 2012/0029697 A1 | 2/2012 | Ota |
| 2012/0035823 A1 | 2/2012 | Carter |
| 2012/0046998 A1 | 2/2012 | Staib |
| 2012/0059743 A1 | 3/2012 | Rao |
| 2012/0072303 A1 | 3/2012 | Brown |
| 2012/0134771 A1 | 5/2012 | Larson |
| 2012/0143726 A1 | 6/2012 | Chirnomas |
| 2012/0185094 A1 | 7/2012 | Rosenstein |
| 2012/0185355 A1 | 7/2012 | Kilroy |
| 2012/0192260 A1 | 7/2012 | Kontsevich |
| 2012/0197431 A1 | 8/2012 | Toebes |
| 2012/0226556 A1 | 9/2012 | Itagaki |
| 2012/0239224 A1 | 9/2012 | McCabe |
| 2012/0255810 A1 | 10/2012 | Yang |
| 2012/0259732 A1 | 10/2012 | Sasankan |
| 2012/0272500 A1 | 11/2012 | Reuteler |
| 2012/0294698 A1 | 11/2012 | Villamar |
| 2012/0303263 A1 | 11/2012 | Alam |
| 2012/0303479 A1 | 11/2012 | Derks |
| 2012/0330458 A1 | 12/2012 | Weiss |
| 2013/0016011 A1 | 1/2013 | Harriman |
| 2013/0026224 A1 | 1/2013 | Ganick |
| 2013/0051667 A1 | 2/2013 | Deng |
| 2013/0054052 A1 | 2/2013 | Waltz |
| 2013/0054280 A1 | 2/2013 | Moshfeghi |
| 2013/0060461 A1 | 3/2013 | Wong |
| 2013/0073405 A1 | 3/2013 | Ariyibi |
| 2013/0096735 A1 | 4/2013 | Byford |
| 2013/0103539 A1 | 4/2013 | Abraham |
| 2013/0105036 A1 | 5/2013 | Smith |
| 2013/0110671 A1 | 5/2013 | Gray |
| 2013/0141555 A1 | 6/2013 | Ganick |
| 2013/0145572 A1 | 6/2013 | Schregardus |
| 2013/0151335 A1 | 6/2013 | Avadhanam |
| 2013/0155058 A1 | 6/2013 | Golparvar-Fard |
| 2013/0174371 A1 | 7/2013 | Jones |
| 2013/0181370 A1 | 7/2013 | Rafie |
| 2013/0211953 A1 | 8/2013 | Abraham |
| 2013/0218453 A1 | 8/2013 | Geelen |
| 2013/0231779 A1 | 9/2013 | Purkayastha |
| 2013/0235206 A1 | 9/2013 | Smith |
| 2013/0238130 A1 | 9/2013 | Dorschel |
| 2013/0245810 A1 | 9/2013 | Sullivan |
| 2013/0276004 A1 | 10/2013 | Boncyk |
| 2013/0300729 A1 | 11/2013 | Grimaud |
| 2013/0302132 A1 | 11/2013 | DAndrea |
| 2013/0309637 A1 | 11/2013 | Minvielle |
| 2013/0317642 A1 | 11/2013 | Asaria |
| 2013/0333961 A1 | 12/2013 | Odonnell |
| 2013/0338825 A1 | 12/2013 | Cantor |
| 2014/0006229 A1 | 1/2014 | Birch |
| 2014/0014470 A1 | 1/2014 | Razumov |
| 2014/0032034 A1 | 1/2014 | Raptopoulos |
| 2014/0032379 A1 | 1/2014 | Schuetz |
| 2014/0037404 A1 | 2/2014 | Hancock |
| 2014/0046512 A1 | 2/2014 | Villamar |
| 2014/0058556 A1 | 2/2014 | Kawano |
| 2014/0067564 A1 | 3/2014 | Yuan |
| 2014/0081445 A1 | 3/2014 | Villamar |
| 2014/0091013 A1 | 4/2014 | Streufert |
| 2014/0100715 A1 | 4/2014 | Mountz |
| 2014/0100768 A1 | 4/2014 | Kessens |
| 2014/0100769 A1 | 4/2014 | Wurman |
| 2014/0100998 A1 | 4/2014 | Mountz |
| 2014/0100999 A1 | 4/2014 | Mountz |
| 2014/0101690 A1 | 4/2014 | Boncyk |
| 2014/0108087 A1 | 4/2014 | Fukui |
| 2014/0124004 A1 | 5/2014 | Rosenstein |
| 2014/0129054 A1 | 5/2014 | Huntzicker |
| 2014/0133943 A1 | 5/2014 | Razumov |
| 2014/0135984 A1 | 5/2014 | Hirata |
| 2014/0136414 A1 | 5/2014 | Abhyanker |
| 2014/0143039 A1 | 5/2014 | Branton |
| 2014/0149958 A1 | 5/2014 | Samadi |
| 2014/0152507 A1 | 6/2014 | McAllister |
| 2014/0156450 A1 | 6/2014 | Ruckart |
| 2014/0156461 A1 | 6/2014 | Lerner |
| 2014/0157156 A1 | 6/2014 | Kawamoto |
| 2014/0164123 A1 | 6/2014 | Wissner-Gross |
| 2014/0172197 A1 | 6/2014 | Ganz |
| 2014/0172727 A1 | 6/2014 | Abhyanker |
| 2014/0177907 A1 | 6/2014 | Argue |
| 2014/0177924 A1 | 6/2014 | Argue |
| 2014/0180478 A1 | 6/2014 | Letsky |
| 2014/0180528 A1 | 6/2014 | Argue |
| 2014/0180865 A1 | 6/2014 | Argue |
| 2014/0180914 A1 | 6/2014 | Abhyanker |
| 2014/0201041 A1 | 7/2014 | Meyer |
| 2014/0207614 A1 | 7/2014 | Ramaswamy |
| 2014/0209514 A1 | 7/2014 | Gitschel |
| 2014/0211988 A1 | 7/2014 | Fan |
| 2014/0214205 A1 | 7/2014 | Kwon |
| 2014/0217242 A1 | 8/2014 | Muren |
| 2014/0228999 A1 | 8/2014 | D'Andrea |
| 2014/0229320 A1 | 8/2014 | Mohammed |
| 2014/0244026 A1 | 8/2014 | Neiser |
| 2014/0244207 A1 | 8/2014 | Hicks |
| 2014/0246257 A1 | 9/2014 | Jacobsen |
| 2014/0247116 A1 | 9/2014 | Davidson |
| 2014/0250613 A1 | 9/2014 | Jones |
| 2014/0254896 A1 | 9/2014 | Zhou |
| 2014/0257928 A1 | 9/2014 | Chen |
| 2014/0266616 A1 | 9/2014 | Jones |
| 2014/0267409 A1 | 9/2014 | Fein |
| 2014/0274309 A1 | 9/2014 | Nguyen |
| 2014/0277693 A1 | 9/2014 | Naylor |
| 2014/0277742 A1 | 9/2014 | Wells |
| 2014/0277841 A1 | 9/2014 | Klicpera |
| 2014/0285134 A1 | 9/2014 | Kim |
| 2014/0289009 A1 | 9/2014 | Campbell |
| 2014/0297090 A1 | 10/2014 | Ichinose |
| 2014/0304107 A1 | 10/2014 | McAllister |
| 2014/0306654 A1 | 10/2014 | Partovi |
| 2014/0309809 A1 | 10/2014 | Dixon |
| 2014/0330456 A1 | 11/2014 | LopezMorales |
| 2014/0330677 A1 | 11/2014 | Boncyk |
| 2014/0344011 A1 | 11/2014 | Dogin |
| 2014/0344118 A1 | 11/2014 | Parpia |
| 2014/0350725 A1 | 11/2014 | LaFary |
| 2014/0350851 A1 | 11/2014 | Carter |
| 2014/0350855 A1 | 11/2014 | Vishnuvajhala |
| 2014/0361077 A1 | 12/2014 | Davidson |
| 2014/0369558 A1 | 12/2014 | Holz |
| 2014/0371912 A1 | 12/2014 | Passot |
| 2014/0379588 A1 | 12/2014 | Gates |
| 2015/0006319 A1 | 1/2015 | Thomas |
| 2015/0029339 A1 | 1/2015 | Kobres |
| 2015/0032252 A1 | 1/2015 | Galluzzo |
| 2015/0045992 A1 | 2/2015 | Ashby |
| 2015/0046299 A1 | 2/2015 | Yan |
| 2015/0066283 A1 | 3/2015 | Wurman |
| 2015/0073589 A1 | 3/2015 | Khodl |
| 2015/0098775 A1 | 4/2015 | Razumov |
| 2015/0100439 A1 | 4/2015 | Lu |
| 2015/0100461 A1 | 4/2015 | Baryakar |
| 2015/0112826 A1 | 4/2015 | Crutchfield |
| 2015/0120094 A1 | 4/2015 | Kimchi |
| 2015/0123973 A1 | 5/2015 | Larsen |
| 2015/0142249 A1 | 5/2015 | Ooga |
| 2015/0203140 A1 | 7/2015 | Holtan |

(56) References Cited

U.S. PATENT DOCUMENTS

| | | |
|---|---|---|
| 2015/0205298 A1 | 7/2015 | Stoschek |
| 2015/0205300 A1 | 7/2015 | Caver |
| 2015/0217449 A1 | 8/2015 | Meier |
| 2015/0217790 A1 | 8/2015 | Golden |
| 2015/0221854 A1 | 8/2015 | Melz |
| 2015/0228004 A1 | 8/2015 | Bednarek |
| 2015/0229906 A1 | 8/2015 | Inacio De Matos |
| 2015/0231873 A1 | 8/2015 | Okamoto |
| 2015/0277440 A1 | 10/2015 | Kimchi |
| 2015/0278889 A1 | 10/2015 | Qian |
| 2015/0325128 A1 | 11/2015 | Lord |
| 2015/0336668 A1 | 11/2015 | Pasko |
| 2015/0360865 A1 | 12/2015 | Massey |
| 2016/0016731 A1 | 1/2016 | Razumov |
| 2016/0023675 A1 | 1/2016 | Hannah |
| 2016/0052139 A1 | 2/2016 | Hyde |
| 2016/0101794 A1 | 4/2016 | Fowler |
| 2016/0101936 A1 | 4/2016 | Chamberlin |
| 2016/0101940 A1 | 4/2016 | Grinnell |
| 2016/0110701 A1 | 4/2016 | Herring |
| 2016/0114488 A1 | 4/2016 | Mascorro Medina |
| 2016/0167557 A1 | 6/2016 | Mecklinger |
| 2016/0167577 A1 | 6/2016 | Simmons |
| 2016/0176638 A1 | 6/2016 | Toebes |
| 2016/0196755 A1 | 7/2016 | Navot |
| 2016/0207193 A1 | 7/2016 | Wise |
| 2016/0210602 A1 | 7/2016 | Siddique |
| 2016/0236867 A1 | 8/2016 | Brazeau |
| 2016/0255969 A1 | 9/2016 | High |
| 2016/0257212 A1 | 9/2016 | Thompson |
| 2016/0257240 A1 | 9/2016 | High |
| 2016/0257401 A1 | 9/2016 | Buchmueller |
| 2016/0258762 A1 | 9/2016 | Taylor |
| 2016/0258763 A1 | 9/2016 | High |
| 2016/0259028 A1 | 9/2016 | High |
| 2016/0259329 A1 | 9/2016 | High |
| 2016/0259331 A1 | 9/2016 | Thompson |
| 2016/0259339 A1 | 9/2016 | High |
| 2016/0259340 A1 | 9/2016 | Kay |
| 2016/0259341 A1 | 9/2016 | High |
| 2016/0259342 A1 | 9/2016 | High |
| 2016/0259343 A1 | 9/2016 | High |
| 2016/0259344 A1 | 9/2016 | High |
| 2016/0259345 A1 | 9/2016 | McHale |
| 2016/0259346 A1 | 9/2016 | High |
| 2016/0260049 A1 | 9/2016 | High |
| 2016/0260054 A1 | 9/2016 | High |
| 2016/0260055 A1 | 9/2016 | High |
| 2016/0260142 A1 | 9/2016 | Winkle |
| 2016/0260145 A1 | 9/2016 | High |
| 2016/0260148 A1 | 9/2016 | High |
| 2016/0260158 A1 | 9/2016 | High |
| 2016/0260159 A1 | 9/2016 | Atchley |
| 2016/0260161 A1 | 9/2016 | Atchley |
| 2016/0261698 A1 | 9/2016 | Thompson |
| 2016/0274586 A1 | 9/2016 | Stubbs |
| 2016/0288601 A1 | 10/2016 | Gehrke |
| 2016/0288687 A1 | 10/2016 | Scherle |
| 2016/0300291 A1 | 10/2016 | Carmeli |
| 2016/0301698 A1 | 10/2016 | Katara |
| 2016/0325932 A1 | 11/2016 | Hognaland |
| 2016/0349754 A1 | 12/2016 | Mohr |
| 2016/0355337 A1 | 12/2016 | Lert |
| 2016/0364785 A1 | 12/2016 | Wankhede |
| 2016/0364786 A1 | 12/2016 | Wankhede |
| 2017/0009417 A1 | 1/2017 | High |
| 2017/0010608 A1 | 1/2017 | High |
| 2017/0010609 A1 | 1/2017 | High |
| 2017/0010610 A1 | 1/2017 | Atchley |
| 2017/0020354 A1 | 1/2017 | High |
| 2017/0024806 A1 | 1/2017 | High |
| 2017/0080846 A1 | 3/2017 | Lord |
| 2017/0107055 A1 | 4/2017 | Magens |
| 2017/0110017 A1 | 4/2017 | Kimchi |
| 2017/0120443 A1 | 5/2017 | Kang |
| 2017/0129602 A1 | 5/2017 | Alduaiji |
| 2017/0137235 A1 | 5/2017 | Thompson |
| 2017/0148075 A1 | 5/2017 | High |
| 2017/0158430 A1 | 6/2017 | Raizer |
| 2017/0166399 A1 | 6/2017 | Stubbs |
| 2017/0176986 A1 | 6/2017 | High |
| 2017/0178066 A1 | 6/2017 | High |
| 2017/0178082 A1 | 6/2017 | High |
| 2017/0183159 A1 | 6/2017 | Weiss |
| 2017/0283171 A1 | 10/2017 | High |
| 2017/0355081 A1 | 12/2017 | Fisher |
| 2018/0020896 A1 | 1/2018 | High |
| 2018/0068357 A1 | 3/2018 | High |
| 2018/0075403 A1 | 3/2018 | Mascorro Medina |
| 2018/0099846 A1 | 4/2018 | High |
| 2018/0170729 A1 | 6/2018 | High |

FOREIGN PATENT DOCUMENTS

| | | |
|---|---|---|
| CN | 100999277 | 7/2007 |
| CN | 102079433 | 6/2011 |
| CN | 202847767 | 4/2013 |
| CN | 103136923 | 5/2013 |
| CN | 103213115 | 7/2013 |
| CN | 203166399 | 8/2013 |
| CN | 203191819 | 9/2013 |
| CN | 203401274 | 1/2014 |
| CN | 203402565 | 1/2014 |
| CN | 103625808 | 3/2014 |
| CN | 203468521 | 3/2014 |
| CN | 103696393 | 4/2014 |
| CN | 103723403 | 4/2014 |
| CN | 203512491 | 4/2014 |
| CN | 103770117 | 5/2014 |
| CN | 203782622 | 8/2014 |
| CN | 104102188 | 10/2014 |
| CN | 104102219 | 10/2014 |
| CN | 102393739 | 12/2014 |
| CN | 204054062 | 12/2014 |
| CN | 204309852 | 12/2014 |
| CN | 204331404 | 5/2015 |
| CN | 105460051 | 4/2016 |
| DE | 102013013438 | 2/2015 |
| EP | 861415 | 5/1997 |
| EP | 1136052 | 9/2001 |
| EP | 0887491 | 4/2004 |
| EP | 1439039 | 7/2004 |
| EP | 1447726 | 8/2004 |
| EP | 2148169 | 1/2010 |
| EP | 2106886 | 3/2011 |
| EP | 2309487 | 4/2011 |
| EP | 2050544 | 8/2011 |
| EP | 2498158 | 9/2012 |
| EP | 2571660 | 3/2013 |
| EP | 2590041 | 5/2013 |
| EP | 2608163 | 6/2013 |
| EP | 2662831 | 11/2013 |
| EP | 2730377 | 5/2014 |
| EP | 2886020 | 6/2015 |
| FR | 2710330 | 3/1995 |
| GB | 1382806 | 2/1971 |
| GB | 2530626 | 3/2016 |
| GB | 2542472 | 3/2017 |
| GB | 2542905 | 5/2017 |
| JP | 62247458 | 10/1987 |
| JP | H10129996 | 5/1998 |
| JP | 2003288396 | 10/2003 |
| JP | 2005350222 | 12/2005 |
| JP | 2009284944 | 12/2009 |
| JP | 2010105644 | 5/2010 |
| JP | 2010231470 | 10/2010 |
| KR | 20120100505 A | 9/2012 |
| WO | 8503277 A | 8/1985 |
| WO | 9603305 | 7/1995 |
| WO | 1997018523 | 5/1997 |
| WO | 9855903 | 12/1998 |
| WO | 2000061438 | 10/2000 |
| WO | 0132366 | 5/2001 |
| WO | 2004092858 | 10/2004 |

(56) References Cited

FOREIGN PATENT DOCUMENTS

| WO | 2005102875 | 11/2005 |
|---|---|---|
| WO | 2006056614 | 6/2006 |
| WO | 2006120636 | 11/2006 |
| WO | 2006137072 | 12/2006 |
| WO | 2007007354 | 1/2007 |
| WO | 2007047514 | 4/2007 |
| WO | 2007149196 | 12/2007 |
| WO | 2008118906 | 10/2008 |
| WO | 2008144638 | 11/2008 |
| WO | 2008151345 | 12/2008 |
| WO | 2009022859 | 2/2009 |
| WO | 2009027835 | 3/2009 |
| WO | 2009103008 | 8/2009 |
| WO | 2011063527 | 6/2011 |
| WO | 2012075196 | 6/2012 |
| WO | 2013138193 | 9/2013 |
| WO | 2013138333 | 9/2013 |
| WO | 2013176762 | 11/2013 |
| WO | 2014022366 | 2/2014 |
| WO | 2014022496 | 2/2014 |
| WO | 2014045225 | 3/2014 |
| WO | 2014046757 | 3/2014 |
| WO | 2014101714 | 7/2014 |
| WO | 2014116947 | 7/2014 |
| WO | 2014138472 | 9/2014 |
| WO | 2014165286 | 10/2014 |
| WO | 2015021958 | 2/2015 |
| WO | 2015104263 | 7/2015 |
| WO | 2015155556 | 10/2015 |
| WO | 2016009423 | 1/2016 |
| WO | 2016015000 | 1/2016 |
| WO | 2016144765 | 9/2016 |

OTHER PUBLICATIONS

U.S. Appl. No. 15/274,991, filed Jan. 12, 2017, Donald R. High.
U.S. Appl. No. 15/275,009, filed Sep. 23, 2016, Donald R. High.
U.S. Appl. No. 15/275,019, filed Sep. 23, 2016, Donald R. High.
U.S. Appl. No. 15/275,047, filed Sep. 23, 2016, Donald R. High.
U.S. Appl. No. 15/282,951, filed Sep. 30, 2016, Donald R. High.
U.S. Appl. No. 15/288,923, filed Oct. 7, 2016, Donald R. High.
U.S. Appl. No. 15/423,812, filed Feb. 3, 2017, Donald R. High.
U.S. Appl. No. 15/446,914, filed Mar. 1, 2017, Donald R. High.
U.S. Appl. No. 15/447,175, filed Mar. 2, 2017, Donald R. High.
U.S. Appl. No. 15/447,202, filed Mar. 2, 2017, Donald R. High.
U.S. Appl. No. 15/471,278, filed Mar. 28, 2017, Donald R. High.
U.S. Appl. No. 15/692,226, filed Aug. 31, 2017, Donald R. High.
U.S. Appl. No. 15/836,708, filed Dec. 8, 2017, Donald R. High.
Daily Mail; "Dancing with your phone: the gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Owano, Nancy; "Hearbo robot can tell beeps, notes, and spoken word (w/ Video)", Phys.org, Nov. 21, 2012, https://phys.org/news/2012-11-hearbo-robot-beeps-spoken-word.html, pp. 1-4.
Sales, Jorge, et al.; "CompaRob: the Shopping Cart Assistance Robot", International Journal of Distributed Sensor Networks, vol. 2016, Article ID 4781280, Jan. 3, 2016, http://dx.doi.org/10.1155/2016/4781280, pp. 1-16.
U.S. Appl. No. 15/698,068, filed Sep. 7, 2017, Donald R. High.
U.S. Appl. No. 15/990,274, filed May 25, 2018, Donald R. High.
U.S. Appl. No. 16/001,774, filed Jun. 6, 2018, Donald R. High.
U.S. Appl. No. 16/059,431, filed Aug. 9, 2018, Donald R. High.
U.S. Appl. No. 16/100,064, filed Aug. 9, 2018, Donald R. High.
U.S. Appl. No. 16/109,290, filed Aug. 22, 2018, Donald R. High.
U.S. Appl. No. 15/060,953, filed Mar. 4, 2016, High.
U.S. Appl. No. 15/061,025, filed Mar. 4, 2016, High.
U.S. Appl. No. 15/061,054, filed Mar. 4, 2016, Kay.
U.S. Appl. No. 15/061,203, filed Mar. 4, 2016, High.
U.S. Appl. No. 15/061,265, filed Mar. 4, 2016, High.
U.S. Appl. No. 15/061,285, filed Mar. 4, 2016, High.
U.S. Appl. No. 15/061,325, filed Mar. 4, 2016, High.
U.S. Appl. No. 15/061,350, filed Mar. 4, 2016, Thompson.
U.S. Appl. No. 15/061,402, filed Mar. 4, 2016, High.
U.S. Appl. No. 15/061,406, filed Mar. 4, 2016, High.
U.S. Appl. No. 15/061,474, filed Mar. 4, 2016, High.
U.S. Appl. No. 15/061,507, Mar. 4, 2016, High.
U.S. Appl. No. 15/061,671, filed Mar. 4, 2016, High.
U.S. Appl. No. 15/061,677, filed Mar. 4, 2016, Taylor.
U.S. Appl. No. 15/061,686, filed Mar. 4, 2016, High.
U.S. Appl. No. 15/061,688, filed Mar. 4, 2016, Thompson.
U.S. Appl. No. 15/061,722, filed Mar. 4, 2016, High.
U.S. Appl. No. 15/061,770, filed Mar. 4, 2016, Atchley.
U.S. Appl. No. 15/061,792, filed Mar. 4, 2016, Winkle.
U.S. Appl. No. 15/061,801, filed Mar. 4, 2016, High.
U.S. Appl. No. 15/061,805, filed Mar. 4, 2016, Atchley.
U.S. Appl. No. 15/061,844, filed Mar. 4, 2016, High.
U.S. Appl. No. 15/061,848, filed Mar. 4, 2016, McHale.
U.S. Appl. No. 15/061,908, filed Mar. 4, 2016, High.
U.S. Appl. No. 15/061,980, filed Mar. 4, 2016, Thompson.
U.S. Appl. No. 15/892,250, filed Feb. 8, 2018, Donald R. High.
Abbrobotics; "ABB Robotics—Innovative Packaging Solutions", https://www.youtube.com/watch?v=e5jif-IUvHY, published on May 16, 2013, pp. 1-5.
Ang, Fitzwatler, et al.; "Automated Waste Sorter With Mobile Robot Delivery Waste System", De La Salle University Research Congress 2013, Mar. 7-9, 2013, pp. 1-7.
Ansari, Sameer, et al.; "Automated Trash Collection & Removal in Office Cubicle Environments", Squad Collaborative Robots, Sep. 27, 2013, pp. 1-23.
Armstrong, Jean, et al.; "Visible Light Positioning: A Roadmap for International Standardization", IEEE Communications Magazine, Dec. 2013, pp. 2-7.
Artal, J.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.
Atherton, Kelsey D.; "New GPS Receiver Offers Navigation Accurate to an Inch", Popular Science, www.popsci.com/technology/article/2013-08/global-positioning-down-inches, Aug. 16, 2013, pp. 1-2.
Avezbadalov, Ariel, et al.; "Snow Shoveling Robot", engineering.nyu.edu/mechatronics/projects/ME3484/2006/Snow Shoveling Robot/Mechatronics Snow Robot Presentation Update 12-19-06.pdf, 2006, pp. 1-24.
Bares, John, et al.; "Designing Crash-Survivable Unmanned Vehicles", AUVSI Symposium, Jul. 10, 2002, pp. 1-15.
Bohren; Jonathan et al.; "Towards Autonomous Robotic Butlers: Lessons Learned with the PR2", Willow Garage, May 9, 2011, pp. 1-8.
Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.
Budgee; "The Robotic Shopping Cart Budgee "; https://www.youtube.com/watch?v=2dYNdVPF4VM; published on Mar. 20, 2015; pp. 1-6.
Burns, Tom; "irobot roomba 780 review best robot vacuum floor cleaning robot review video demo", https://www.youtube.com/watch?v=MkwtlyVAaEY, published on Feb. 13, 2013, pp. 1-10.
Bytelight; "Scalable Indoor Location", http://www.bytelight.com/, Dec. 12, 2014, pp. 1-2.
Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.
Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.

(56) References Cited

OTHER PUBLICATIONS

Carnegie Mellon Univeristy; "AndyVision—The Future of Retail", https://www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot by Voice and Computer Commands", International Journal of Advanced Research in Computer and Communication Engineering, vol. 2, Issue 4, Apr. 2013, pp. 1-3.
CNET; "iRobot Braava 380t—No standing ovation for this robotic floor mop", https://www.youtube.com/watch?v=JAtCIxFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Davis, Jo; "The Future of Retail: In Store Now", Online Brands, http://onlinebrands.co.nz/587/future-retail-store-now/, Nov. 16, 2014, pp. 1-5.
Denso; "X-mobility", Oct. 10, 2014, pp. 1-2, including machine translation.
DHL; "Self-Driving Vehicles in Logistics: A DHL perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
Dronewatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #Dyson Robot", https://www.youtube.com/watch?v=OadhulCDAjk, published on Sep. 4, 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation.", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, May 19, 2015, pp. 1-3.
Fellowrobots; "Oshbot Progress—Fellow Robots", https://vimeo.com/139532370, published Sep. 16, 2015, pp. 1-5.
Follow Inspiration; "wiiGO"; https://www.youtube.com/watch?v=dhHXIdpknC4; published on Jun. 16, 2015; pp. 1-7.
Fora.Tv; "A Day in the Life of a Kiva Robot", https://www.youtube.com/watch? v=6KRjuuEVEZs, published on May 11, 2011, pp. 1-11.
GAMMA2VIDEO; "FridayBeerBot.wmv", https://www.youtube.com/watch?v=KXXIIDYatxQ, published on Apr. 27, 2010, pp. 1-7.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al; "Report on evaluation of the robot trolley", CommRob IST-045441, Advanced Behaviour and High-Level Multimodal Communications with and among Robots, Jun. 14, 2010, pp. 10-67.
Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6C0, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=lWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasystems.com/solutions/vertical-storage/, printed on Apr. 2, 2015, pp. 1-2.
Kiva Systems; "How Kiva Systems and Warehouse Management Systems Interact", 2010, pp. 1-12.
Kiva Systems; "Kiva replenishment is more productive and accurate than replenishing pick faces in traditional distribution operations", http//www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Kiva's warehouse automation system is the most powerful and flexible A . . . ", http://www.kivasystems.com/solutions/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.

(56) References Cited

OTHER PUBLICATIONS

Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Kumar, Swagat; "Robotics-as-a-Service: Transforming the Future of Retail", Tata Consultancy Services, http://www.tcs.com/resources/white_papers/Pages/Robotics-as-Service.aspx, printed on May 13, 2015, pp. 1-4.
Lejepekov, Fedor; "Yuki-taro. Snow recycle robot.", https://www.youtube.com/watch?v=gl2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-Go—The autonomous and self-driven shopping cart"; https://www.indiegogo.com/projects/wi-go-the-autonomous-and-self-driven-shopping-cart; printed on Feb. 27, 2015, pp. 1-16.
Meena, M., & Thilagavathi, P.; "Automatic Docking System with Recharging and Battery Replacement for Surveillance Robot", International Journal of Electronics and Computer Science Engineering, 2012, pp. 1148-1154.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
Neurobtv; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec 15-18, 2007; pp. 1506-1511.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Onozato, Taishi et al.; "A Control System for the Robot Shopping Cart"; 2010 IRAST International Congress on Computer Applications and Computational Science (CACS 2010); 2010; pp. 907-910.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.

Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=oBHYwYlo1UE, published on Sep. 8, 2014, pp. 1-6.
Rodriguez, Ashley; "Meet Lowe's Newest Sales Associate—OSHbot, the Robot", Advertising Age, http://adage.com/article/cmo-strategy/nneet-lowe-s-newest-sales-associate-oshbot-robot/295591/, Oct. 28, 2014, pp. 1-8.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.
Sebaali, G., et al.; "Smart Shopping Cart", Department of Electrical and Computer Engineering, American University of Beirut, 2014, pp. 1-6.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, Aug. 14, 2014, pp. 1-5.
SK Telecom Co.; "SK Telecom Launches Smart Cart Pilot Test in Korea"; http://www.sktelecom.com/en/press/press_detail.do?idx=971; Oct. 4, 2011; pp. 1-2.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.geekwire.com/2012/hointer-robot-jeans-clothing-apparel-store-startup/, Nov. 29, 2012, pp. 1-12.
Stewart Golf; "Introducing the NEW Stewart Golf X9 Follow", https://www.youtube.com/watch?v=HHivFGtiuE, published on Apr. 9, 2014, pp. 1-9.
Sun, Eric; ""Smart Bin & Trash Route" system—RMIT 2012 Green Inventors Competition", http://www.youtube.com/watch?v=OrTA57alO0k, published on Nov. 14, 2012, pp. 1-8.
Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
Technion; "Autonomous Tracking Shopping Cart—Shopping Made Easy from Technion"; https://www.youtube.com/watch?v=pQcb9fofmXg; published on Nov. 23, 2014; pp. 1-10.
Universal Robotics; "Neocortex Enables Random Part Handling and Automated Assembly", http://www.universalrobotics.com/random-bin-picking, printed on Dec. 22, 2015, pp. 1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
USPTO; U.S. Appl. No. 15/061,402; Notice of Allowance dated Nov. 27, 2017; (pp. 1-5).
USPTO; U.S. Appl. No. 15/061,402; Office Action dated Aug. 4, 2017; (pp. 1-15).
Vasilescu, Iuliu, et al.; "Autonomous Modular Optical Underwater Robot (AMOUR) Design, Prototype and Feasibility Study", Apr. 18, 2005, pp. 1-7.
Vmecavacuumtech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.

(56) References Cited

OTHER PUBLICATIONS

Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USATODAY, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wikipedia; "Leeds Kirkgate Market"; https://en.wikipedia.org/wiki/Leeds_Kirkgate_Market; Retrieved on Apr. 5, 2017; 8 pages.
Wired; "High-Speed Robots Part 1: Meet BettyBot in "Human Exclusion Zone" Warehouses—The Window—WIRED", https://www.youtube.com/watch?v=8gy5tYVR-28, published on Jul. 2, 2013, pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_S0Kc, published on Jul. 12, 2012, pp. 1-7.

\* cited by examiner

SYSTEMS, DEVICES AND METHODS OF CONTROLLING MOTORIZED TRANSPORT UNITS IN FULFILLING PRODUCT ORDERS

RELATED APPLICATIONS

This application is a continuation of U.S. application Ser. No. 15/061,402, filed Mar. 4, 2016, which is incorporated herein by reference in its entirety, and which claims the benefit of each of the following U.S. Provisional applications, each of which is incorporated herein by reference in its entirety: U.S. Provisional Application No. 62/129,726, filed Mar. 6, 2015; U.S. Provisional Application No. 62/129,727, filed Mar. 6, 2015; U.S. Provisional Application No. 62/138,877, filed Mar. 26, 2015; U.S. Provisional Application No. 62/138,885, filed Mar. 26, 2015; U.S. Provisional Application No. 62/152,421, filed Apr. 24, 2015; U.S. Provisional Application No. 62/152,465, filed Apr. 24, 2015; U.S. Provisional Application No. 62/152,440, filed Apr. 24, 2015; U.S. Provisional Application No. 62/152,630, filed Apr. 24, 2015; U.S. Provisional Application No. 62/152,711, filed Apr. 24, 2015; U.S. Provisional Application No. 62/152,610, filed Apr. 24, 2015; U.S. Provisional Application No. 62/152,667, filed Apr. 24, 2015; U.S. Provisional Application No. 62/157,388, filed May 5, 2015; U.S. Provisional Application No. 62/165,579, filed May 22, 2015; U.S. Provisional Application No. 62/165,416, filed May 22, 2015; U.S. Provisional Application No. 62/165,586, filed May 22, 2015; U.S. Provisional Application No. 62/171,822, filed Jun. 5, 2015; U.S. Provisional Application No. 62/175,182, filed Jun. 12, 2015; U.S. Provisional Application No. 62/182,339, filed Jun. 19, 2015; U.S. Provisional Application No. 62/185,478, filed Jun. 26, 2015; U.S. Provisional Application No. 62/194,131, filed Jul. 17, 2015; U.S. Provisional Application No. 62/194,119, filed Jul. 17, 2015; U.S. Provisional Application No. 62/194,121, filed Jul. 17, 2015; U.S. Provisional Application No. 62/194,127, filed Jul. 17, 2015; U.S. Provisional Application No. 62/202,744, filed Aug. 7, 2015; U.S. Provisional Application No. 62/202,747, filed Aug. 7, 2015; U.S. Provisional Application No. 62/205,548, filed Aug. 14, 2015; U.S. Provisional Application No. 62/205,569, filed Aug. 14, 2015; U.S. Provisional Application No. 62/205,555, filed Aug. 14, 2015; U.S. Provisional Application No. 62/205,539, filed Aug. 14, 2015; U.S. Provisional Application No. 62/207,858, filed Aug. 20, 2015; U.S. Provisional Application No. 62/214,826, filed Sep. 4, 2015; U.S. Provisional Application No. 62/214,824, filed Sep. 4, 2015; U.S. Provisional Application No. 62/292,084, filed Feb. 5, 2016; U.S. Provisional Application No. 62/302,547, filed Mar. 2, 2016; U.S. Provisional Application No. 62/302,567, filed Mar. 2, 2016; U.S. Provisional Application No. 62/302,713, filed Mar. 2, 2016; and U.S. Provisional Application No. 62/303,021, filed Mar. 3, 2016.

TECHNICAL FIELD

These teachings relate generally to shopping environments and more particularly to devices, systems and methods for assisting customers and/or workers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, customers may submit customer orders for one or more products that can be time consuming to fulfill, and particularly during peak hours, there may not be enough employees available to assist customers. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein.

Figure 1:
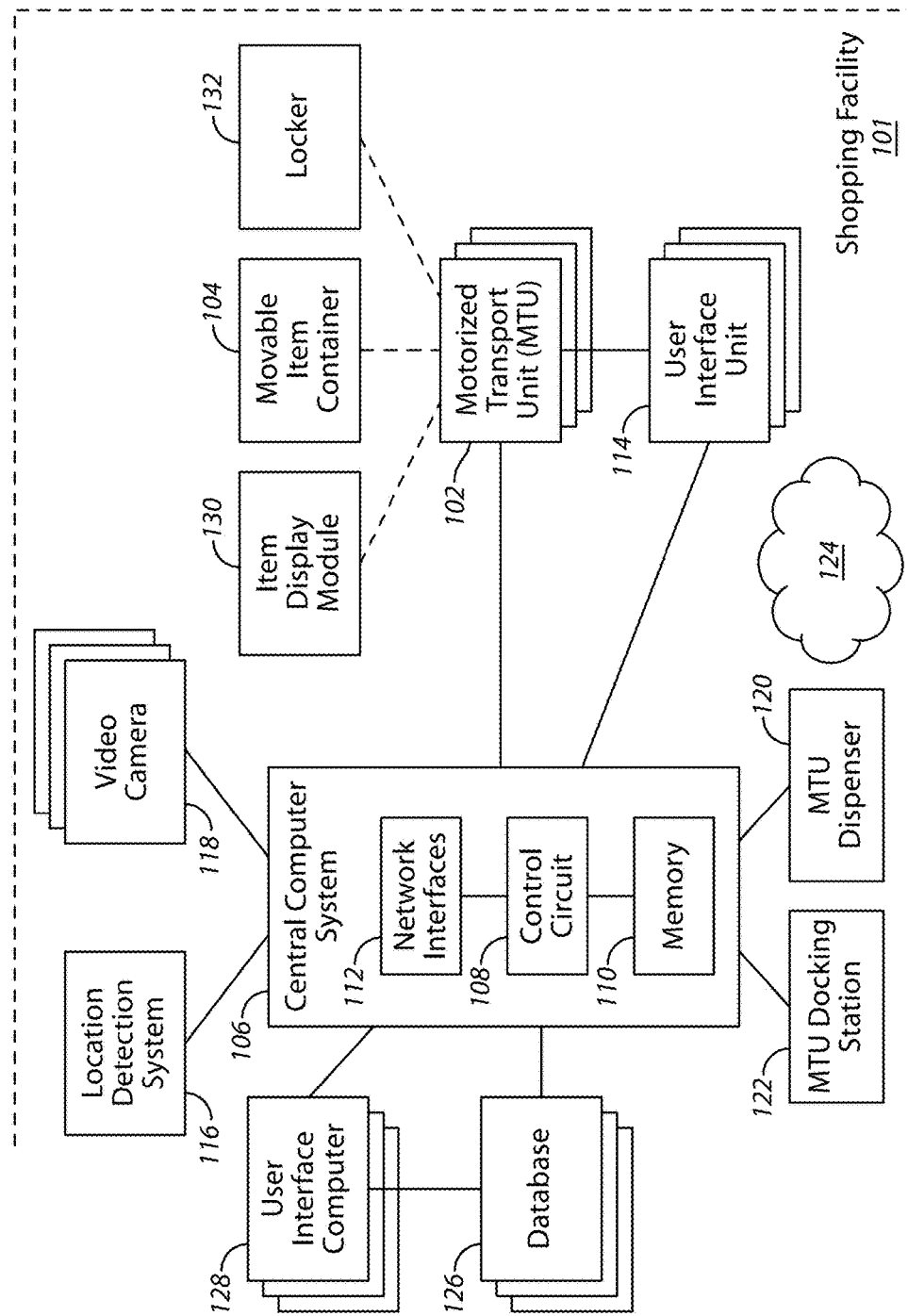
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations, parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the shopping area may include product storage units, shelves, racks, modules, bins, etc., and other walls, dividers, partitions, etc. that may be configured in different layouts or physical arrangements. In other examples, persons or other movable objects may be freely and independently traveling through the shopping facility space. And in other examples, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein. It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-11 expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, Wi-Fi, Zigbee or Bluetooth network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a Wi-Fi wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the ByteLight system from ByteLight of Boston, Mass. In embodiments using a ByteLight system, a typical display screen of the typical smart phone device can be used as a light sensor or light receiver to receive and process data encoded into the light from the ByteLight light sources.

In other embodiments, the location detection system 116 includes a series of low energy radio beacons (e.g., Bluetooth low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
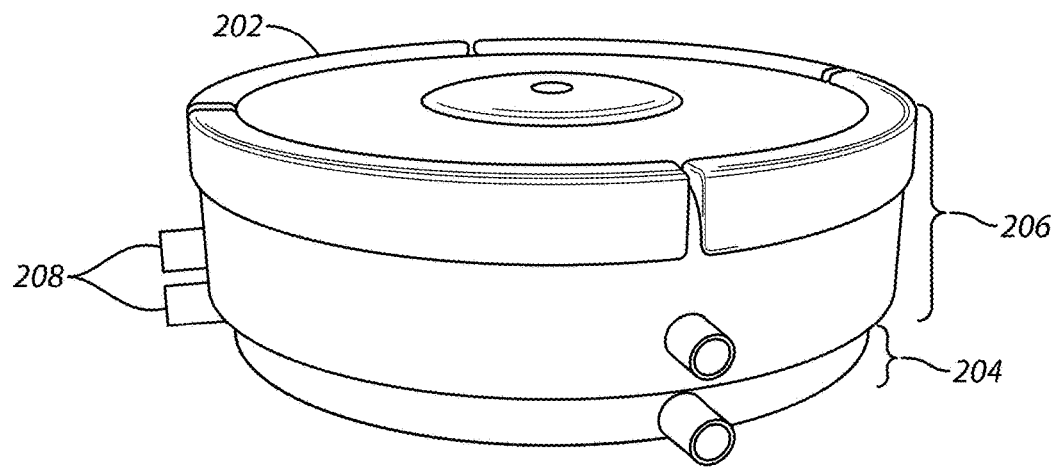
FIGS. 2A and 2B are illustrations of a motorized transport unit of the system of FIG. 1 in a retracted orientation and an extended orientation in accordance with some embodiments.
Figure 2B:
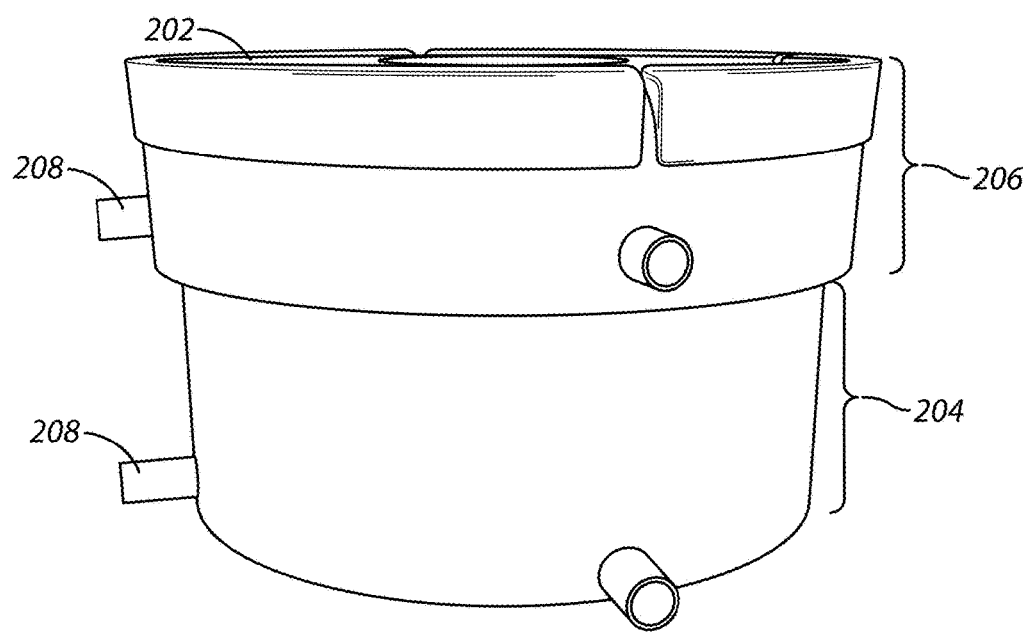

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204. That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3A:
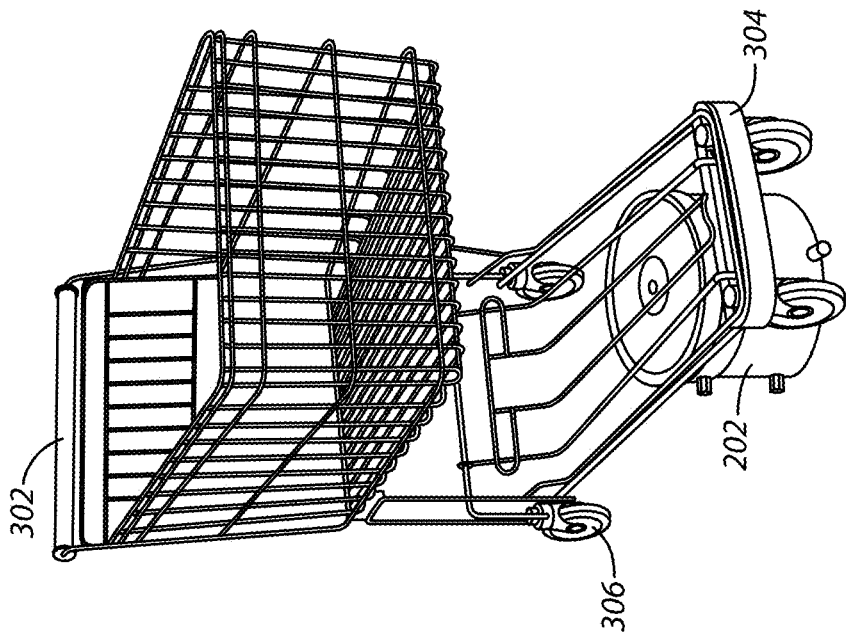
FIGS. 3A and 3B are illustrations of the motorized transport unit of FIGS. 2A and 2B detachably coupling to a movable item container, such as a shopping cart, in accordance with some embodiments.
Figure 3B:
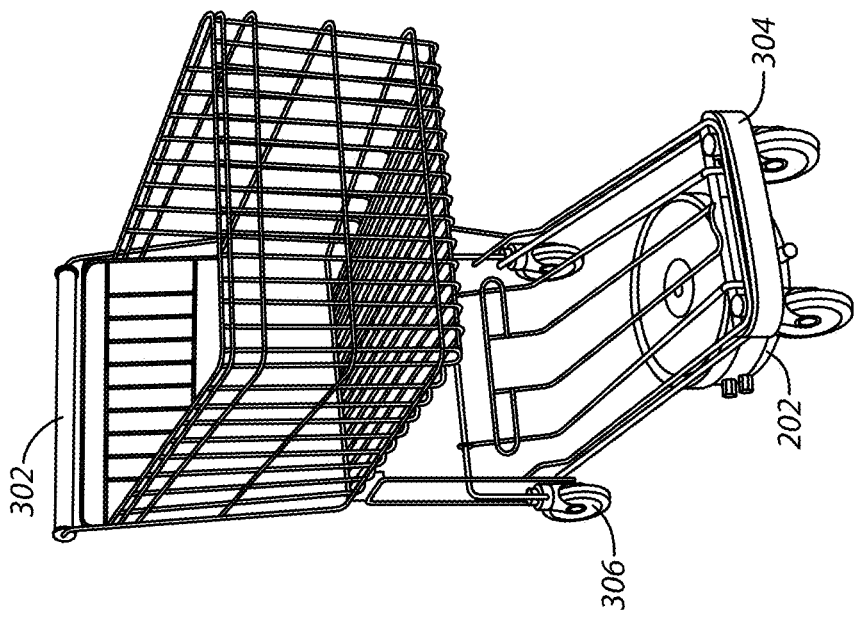

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
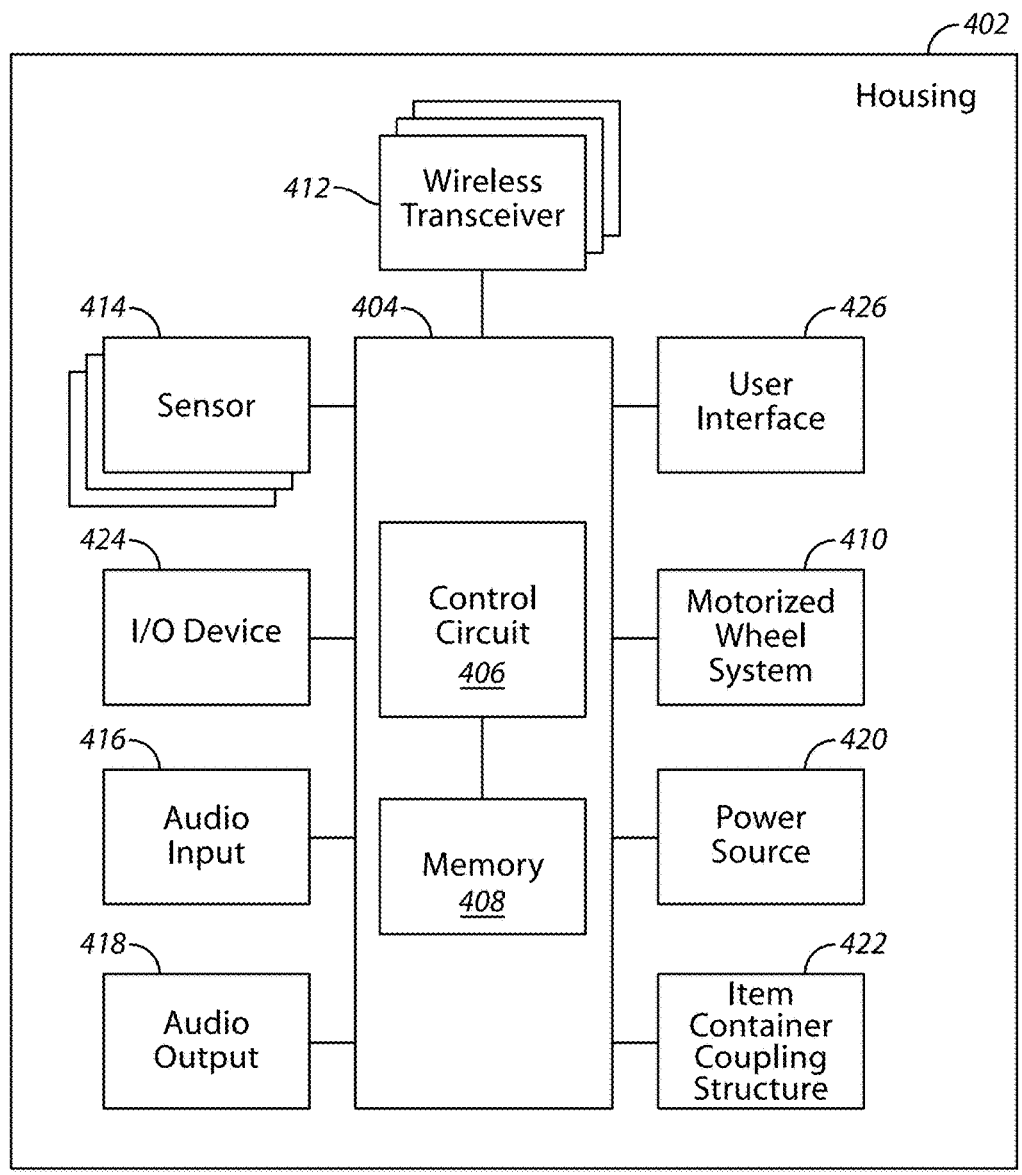
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

It is noted that not all components illustrated in FIG. 4 are included in all embodiments of the motorized transport unit 102. That is, some components may be optional depending on the implementation.

Figure 5:
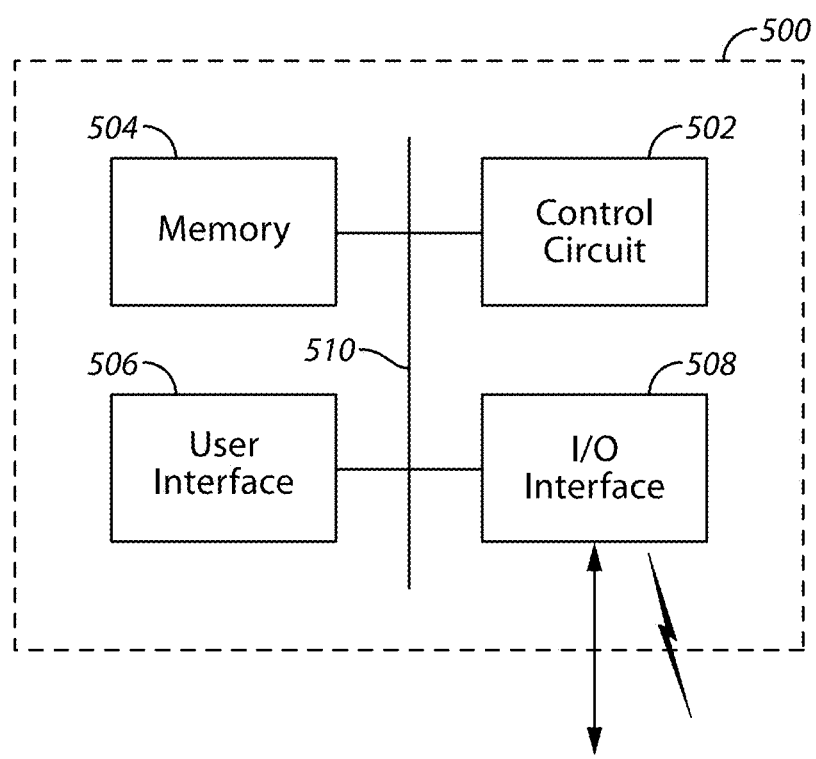
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the ByteLight system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, Bluetooth low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold Diet Coke product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at a MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit it loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to do use the system 100. In some embodiments, communications throughout the session are encrypted using SSL or other methods at transport level.

Further Details of Some Embodiments

In accordance with some embodiments, further details are now provided for one or more of these and other features. For example, generally speaking, pursuant to various embodiments, systems, apparatuses, processes and methods are provided herein that automate the fulfillment of a customer's submitted order for one or more products at a shopping facility. This is typically very different than the fulfillment of a customer's product order through a warehouse due in part to the relatively large number of customers that access a majority if not all of the shopping facility. As such, these customers are moving through at least the sales floor area of the shopping facility, which in many instances is where products are acquired to fulfill the customers' product orders.

In some embodiments, one or more motorized transport units are each directed by the central computer system 106 to cooperate with a product pick unit (PPU) to transport the product pick unit through the shopping facility to locations where products requested by a customer are located. The central computer system can then direct the product pick unit to retrieve the requested product from product storage units, shelves, racks, modules, bins, etc. Typically, the product pick unit is separate from the motorized transport unit and independently and separately communicates with the central computer system. The motorized transport unit is directed to temporarily and removably cooperate with a product pick unit. In other embodiments, however, a motorized transport unit can be configured and dedicated as a product retrieval unit with a product pick unit fixed with and part of the motorized transport unit.

Figure 6:
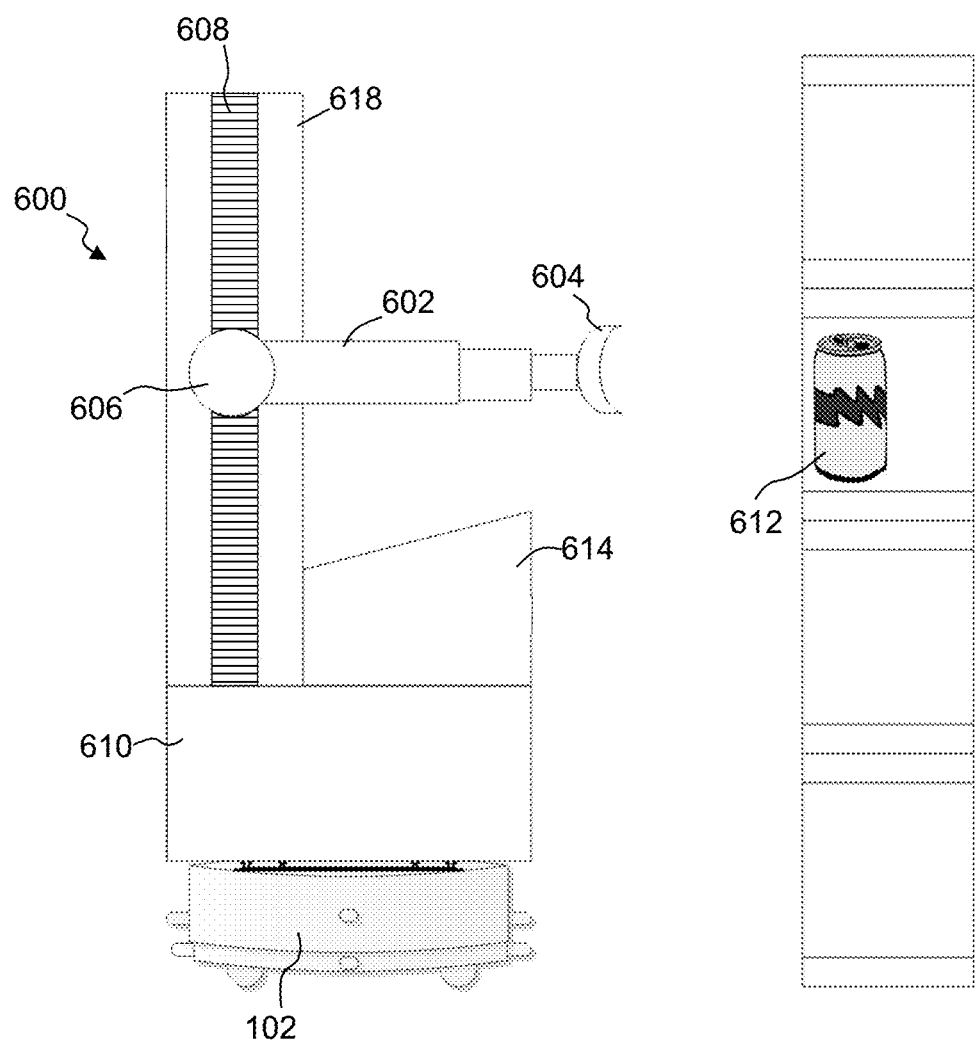
FIG. 6 illustrates a simplified block diagram side view of an exemplary product pick unit (PPU) cooperated with a motorized transport unit, as configured in accordance with various embodiments of these teachings.

FIG. 6 illustrates a simplified block diagram side view of an exemplary product pick unit 600 cooperated with a motorized transport unit 102, as configured in accordance with various embodiments of these teachings. Again, the motorized transport unit is typically temporarily and removably cooperated with the product pick unit 600. For example, the product pick unit may be positioned at a docking and/or charging station and the central computer system can wirelessly communicate commands to a motorized transport unit to move under and removably couple with the product pick unit. The motorized transport unit can then move through the shopping facility transporting the product pick unit 600 to intended locations to allow the product pick unit to acquire the intended product 612. Further, the cooperation of the motorized transport unit and the product pick unit allows a method of directing motorized transport units (MTUs) to transport product pick units to retrieve customer ordered products.

In some embodiments, the product pick unit 600 includes one or more pick arms 602 with a vacuum cup system 604, product cup or product grasper; one or more pick arm motors 606, hydraulics, linear actuators, servo motors, screw drives, levers, gearing and the like; one or more vertical tracks 608 extending along a support column or tower 618; and one or more product containment compartments 610. Some embodiments additionally include one or more product catch pouches 614, which typically cooperates with the containment compartment. Further, some embodiments include a vacuum system 722 (see FIG. 7) as part of or that cooperates with the vacuum cup system. In some implementations the product pick unit is configured to removably cooperate with any one of multiple different motorized transport units 102.

The product pick unit 600 is configured to removably cooperate with a motorized transport unit 102 and be moved through the shopping facility by the motorized transport unit. The motorized transport unit communicates with the central computer system 106 to receive routing information to direct the motorized transport unit to a location where the relevant one of the product pick units are located. In some embodiments, the motorized transport unit utilizes the item container coupling structure or other locking system to removably secure the product pick unit with the motorized transport unit. As with the cooperation to a movable item container, the motorized transport unit secures with the product pick unit to readily move the product pick unit throughout at least portions of the shopping facility.

The product pick unit utilizes the one or more arms 602 and graspers (e.g., vacuum cup 604) to retrieve one or more products. Each product can be placed in one of the one or more product containment compartments 610. In some instances, the product pick unit may be pulling products for different orders, and the different containment compartments can be used to separate products for the different orders being fulfilled.

Typically, the one or more pick arm motors 606 or other such structures are used to move the arm 602 and/or portions of the arm to position the vacuum cup or other such grasper. For example, a motor may cooperate with gearing that in turn cooperates with the vertical tracks 608 to allow one or more arms to be vertically lifted or lowered and accurately positioned relative to a product to be retrieved. Similarly, one or more motors, hydraulics or the like can move one or more portions of the arm to desired locations.

Figure 7:
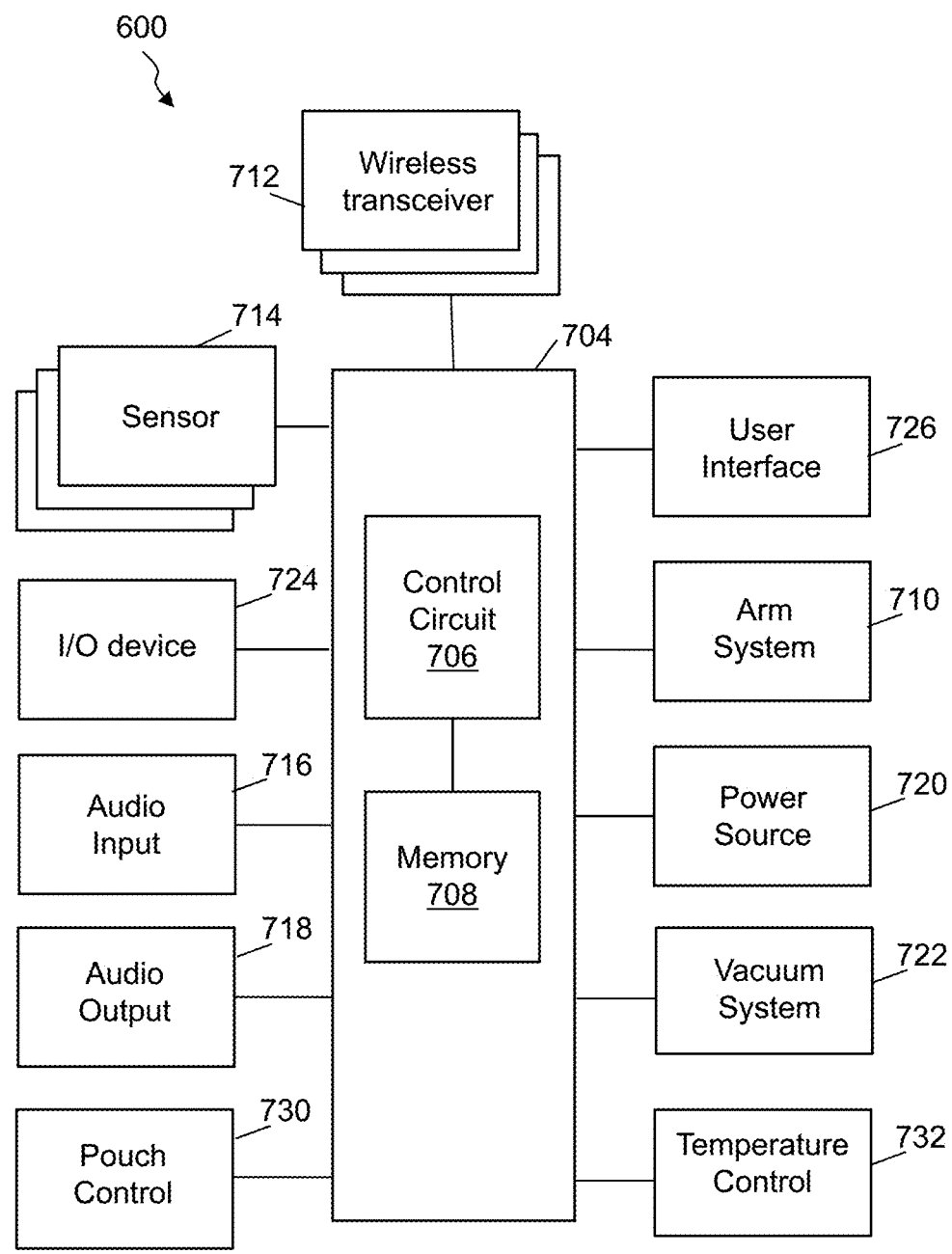
FIG. 7 illustrates a more detailed example of some embodiments of the product pick unit of FIG. 6, in accordance with some embodiments.

FIG. 7 illustrates a more detailed example of some embodiments of the product pick unit 600 of FIG. 6, in accordance with some embodiments. In this example, the product pick unit includes a control unit 704 comprising a control circuit 706 that, like the control circuit 108 of the central computer system 106, controls the general operations of the product pick unit 600. Accordingly, the control unit 704 also includes a memory 708 coupled to the control circuit 706 and that stores, for example, operating instructions and/or useful data.

The control circuit 706 operably couples to an arm system 710 that cooperates with at least one arm 602 and comprises one or more arm motors, hydraulics, springs, linear actuators, servo motors, screw drives, levers, gearing and the like. The arm 602 typically includes one or more movable sections that are moved through activation of the one or more arm motors, hydraulics, springs and the like to move the product cup of the vacuum cup system 604 to align with a desired product to be retrieved. The movable arm sections can be configured to telescope, hinge, bend or otherwise move to position the product cup. The arm motors, hydraulics and the like may be positioned on the one or more arms 602, in a base and/or in the containment compartment, or distributed over portions of the product pick unit (e.g., some on the arm, some in a base). Further, in some embodiments, the arm system 710 includes one or more tack motors and vertical track engagements (e.g., clamps, gearing, etc.) to allow the arm system and/or arm to be moved vertically up and down (e.g., relative to the ground on which the motorized transport unit is transporting the product pick unit 600). The control circuit 706 provides control over the arm system 710 controls motors, hydraulics and the like, and/or a sub-control system is included in the arm system that controls motors, hydraulics and the like in accordance with instructions from the control circuit 706.

In this illustrative example, the control circuit 706 also operably couples to at least one wireless transceiver 712 that operates according to any known wireless protocol. This wireless transceiver 712 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 706 of the product pick unit 600 can provide information to the central computer system 106 and can receive information and/or instructions from the central computer system 106. As one simple example in these regards, the control circuit 706 can receive instructions from the central computer system 106 regarding the control of the product pick unit, such as but not limited to control of the arm system 710, positioning of the product cup, acquisition of sensor information, communication of sensor information, and the like. These teachings will accommodate using any of a wide variety of wireless technologies as desired and/or as may be appropriate in a given application setting. These teachings will also accommodate employing two or more different wireless transceivers 712 if desired.

The control circuit 706 also couples to one or more on-board sensors 714. These teachings will accommodate a wide variety of sensor technologies and form factors. In some embodiments, the sensors include one or more video cameras that capture video that is provided back to the central computer system for evaluation in controlling the movement of the motorized transport unit 102 and features of the product pick unit (e.g., arms 602, cups, etc.). By one approach at least one such sensor 714 can comprise a light sensor or light receiver. When the aforementioned location detection system 116 comprises a plurality of light emitters disposed at particular locations within the shopping facility 101, such a light sensor can provide information that the control circuit 706 and/or the central computer system 106 employs to determine a present location and/or orientation of the product pick unit 600, and thus the motorized transport unit. It is noted that in some implementations, the cooperation of the motorized transport unit with a product pick unit may interfere with the ability of one or more sensors 414 on the motorized transport unit. Accordingly, the central computer system may utilize sensor data received from one or more sensors 714 on the product pick unit in place of sensor data from one or more sensors 414 on the motorized transport unit.

As another example, such a sensor 714 can comprise a distance measurement unit configured to detect a distance between the product pick unit 600 and one or more objects or surfaces around the product pick unit (such as a shelving unit or other product storage unit, a product on a shelf, an object that lies in a projected path of movement of the motorized transport unit through the shopping facility 101, and the like). These teachings will accommodate any of a variety of distance measurement units including optical units and sound/ultrasound units. In one example, a sensor 714 comprises a laser distance sensor device capable of determining a distance to objects in proximity to the sensor. In some embodiments, a sensor 714 comprises an optical based scanning device to sense and read optical patterns in proximity to the sensor, such as bar codes variously located on structures in the shopping facility 101. In some embodiments, a sensor 714 comprises a radio frequency identification (RFID) tag reader capable of reading RFID tags in proximity to the sensor. Such sensors may be useful to determine proximity to nearby objects, retrieving products from a shelf or the like, avoid collisions, orient the motorized transport unit at a proper alignment orientation to allow the product pick unit to retrieve a product, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the product pick unit 600 and motorized transport unit 102 in a given application setting.

In this example the product pick unit 600 includes a rechargeable power source 720 such as one or more batteries, capacitors, other such storage sources or combinations of such sources. The power provided by the rechargeable power source 720 can be made available to whichever components of the product pick unit that require electrical energy. By one approach the product pick unit includes a plug or other electrically conductive interface that the control circuit 706 can utilize to automatically connect to an external source of electrical energy to thereby recharge the rechargeable power source. In some implementations, some or all of the power of the product pick unit may be supplied by the motorized transport unit. A power and/or communication coupling may be established between the motorized transport unit and the product pick unit, such as through one or more container coupling structures 422, electrodes, and/or other such connectors. Further, in some instances, the central computer system may communicate with the product pick unit through the motorized transport unit (e.g., with the motorized transport unit relaying instructions from the central computer system to the product pick unit).

In this illustrative example, the product pick unit further includes at least one vacuum system 722 or other product grasping system, gripping system, hooking system or the like, with the control circuit 706 also coupled to the at least one vacuum system 722. The vacuum system includes a vacuum source that generates a vacuum pressure that couples through a hose to one or more of the vacuum cup systems 604 to induce a vacuum force used by the product cup to grasp a desired product. In some implementations, the vacuum source in positioned within a base of the product pick unit and/or positioned within the support column 618 along which the track 608 extends. The hose extends from the vacuum source along the arm 602 to the product cup. The hose is cooperated with sufficient slack and/or allows sufficient elasticity so that arm movement is not inhibited regardless of the position, extension and orientation of the arm. The product cup may have substantially any configuration, depending on one or more intended products to be retrieved by the product pick unit. In some instances, the product cup may have a curved product surface, while in other instances it may be flat, convex, concave, or other relevant shape. Similarly, the product cup may have a circular cross-section, square, rectangular, or substantially any relevant shape. Further, the size of the product cup may vary in size. Some embodiments may include multiple interchangeable cups, hooks or other such graspers. For example, multiple different cups, hooks or the like may be stored on the product pick unit, and instructions can be communicated to the product pick unit to switch between two graspers.

Further, in some embodiments, the product pick unit 600 further includes a catch pouch control system 730. The control circuit 706 couples with the pouch control system to direct the pouch control system to open or close a release or door that allows a product deposited into the catch pouch 614 to be transferred to a storage box, bag or the like in the containment compartment 610. Additionally, in some implementations, the pouch control system is configured to raise and lower the vertical location of the catch pouch, and/or extend and retract laterally. The pouch control system may include one or more motors, hydraulics, linear actuators, servo motors, screw drives, levers, gearing and the like to move the catch pouch. The raising and lowering is typically dependent on a location of the product being retrieved and may in some respects mirror vertical movement of one or more arms 602. For example, when the product pick unit is retrieving a product the pouch control system 730 can be configured to raise or lower the catch pouch to be directly under a shelf or other structure upon which the product is supported so that as the product is removed (e.g., pulled from the shelf) it is deposited and/or allowed dropped into the catch pouch. The catch pouch can then be lowered to allow the product to be placed into a storage box. In some embodiments the catch pouch 614 is cooperated with the track 608 (or a separate track) and the pouch control system 730 is configured to control one or more motors to raise and lower the catch pouch 614 along the track. The extending and retracting may be dependent on a location of the product pick unit relative to the product storage unit upon which a desired product is positioned.

The product pick unit 600, in some embodiments, may further include one or more temperature control systems 732 that cooperate with a temperature controlled containment compartment 610 or a temperature controlled portion of the containment compartment. The temperature control system can maintain a temperature within the temperature controlled portion of the containment compartment allowing products having predefined temperature limits at which the product is to be maintained to be deposited within the temperature controlled portion of the containment compartment. Additionally or alternatively, the containment compartment may include insulation configured to slow a temperature variation of a product placed within the containment compartment.

Typically, the product pick unit 600 is separate and distinct from the motorized transport units, and temporarily cooperates with a motorized transport unit to be transported to locations to retrieve one or more products. By one approach, however, the product pick unit comprises an integral part of a motorized transport unit or a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing a housing of the product pick unit to the motorized transport unit housing 402 using bolts or other threaded fasteners as versus, for example, a clip.

These teachings will also accommodate selectively and temporarily attaching the motorized transport unit 102 to the product pick unit 600. In some implementations, the motorized transport unit 102 utilizes the movable item container coupling structure 422 to temporarily cooperate with the product pick unit. The control circuit 202 controls the movable item container coupling structure to, for example, transition between the latched and unlatched states. So configured, by one approach the control circuit 406 of the motorized transport unit can be directed to move towards a particular product pick unit until the movable item container coupling structure 422 can engage one or more portions of the product pick unit to thereby temporarily physically couple the motorized transport unit 102 to the product pick unit. So latched, the motorized transport unit 102 can then cause the product pick unit to move with the motorized transport unit. Some embodiments utilize a lifting system of the motorized transport unit to position the item container coupling structure to allow it to engage a bar, clasp, or the like, and in some instances may be configured to lift a portion of the product pick unit off of the ground.

In some embodiments, the product pick unit 600 includes an input/output (I/O) device 724 that is coupled to the control circuit 706. The I/O device 724 allows an external device to couple to the control unit 704. The function and purpose of connecting devices will depend on the application. In some examples, devices connecting to the I/O device 724 may add functionality to the control unit 704, allow the exporting of data from the control unit 704, allow the diagnosing of the product pick unit 600, and so on.

In some embodiments, the product pick unit may include a user interface 726 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 726 may work together with or separate from any user interface implemented at a user interface unit 114 (such as a smart phone or tablet device).

The control unit 704 includes a memory 708 coupled to the control circuit 706 and that stores, for example, operating instructions and/or useful data. The control circuit 706 can comprise a fixed-purpose hard-wired platform or can comprise a partially or wholly programmable platform. These architectural options are well known and understood in the art and require no further description here. This control circuit 706 is configured (for example, by using corresponding programming stored in the memory 708 as will be well understood by those skilled in the art) to carry out one or more of the steps, actions, and/or functions described herein. The memory 708 may be integral to the control circuit 706 or can be physically discrete (in whole or in part) from the control circuit as desired. This memory can also be local with respect to the control circuit 706 (where, for example, both share a common circuit board, chassis, power supply, and/or housing) or can be partially or wholly remote with respect to the control circuit. This memory 708 can serve, for example, to non-transitorily store the computer instructions that, when executed by the control circuit, cause the control circuit to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Some embodiments optionally include an audio input 716 (such as a microphone) and/or an audio output 718 (such as a speaker) that operably couple to the control circuit 706. So configured the control circuit 706 can provide a variety of audible sounds to thereby communicate with a user of the product pick unit, other persons in the vicinity of the product pick unit, or even other motorized transport units 102 and/or product pick units. These audible sounds can include any of a variety of tones and other non-verbal sounds. These audible sounds can also include, in lieu of the foregoing or in combination therewith, pre-recorded or synthesized speech.

The audio input 716, in turn, provides a mechanism whereby, for example, a user provides verbal input to the control circuit 706. That verbal input can comprise, for example, instructions, inquiries, or information. The control circuit 706 can cause that detected verbalized data to be transmitted to the central computer system 106 via a wireless transceiver 712. The central computer system 106 can process that verbal input to recognize the content and to then determine an appropriate response. That response might comprise, for example, transmitting back to the product pick unit or the associated motorized transport unit 102 specific instructions regarding how to operate and/or move.

It is noted that not all components illustrated in FIG. 4 are included in all embodiments of the motorized transport unit 102. That is, some components may be optional depending on the implementation.

As illustrated in FIG. 6, in some implementations the product pick unit 600 is supported by the motorized transport unit 102 (e.g., positioned on top of the motorized transport unit). In other implementations, however, the product pick unit includes wheels or other such features to allow the product pick unit to readily be moved by motorized transport unit without having to support all of the weight of the product pick unit.

Figure 8:
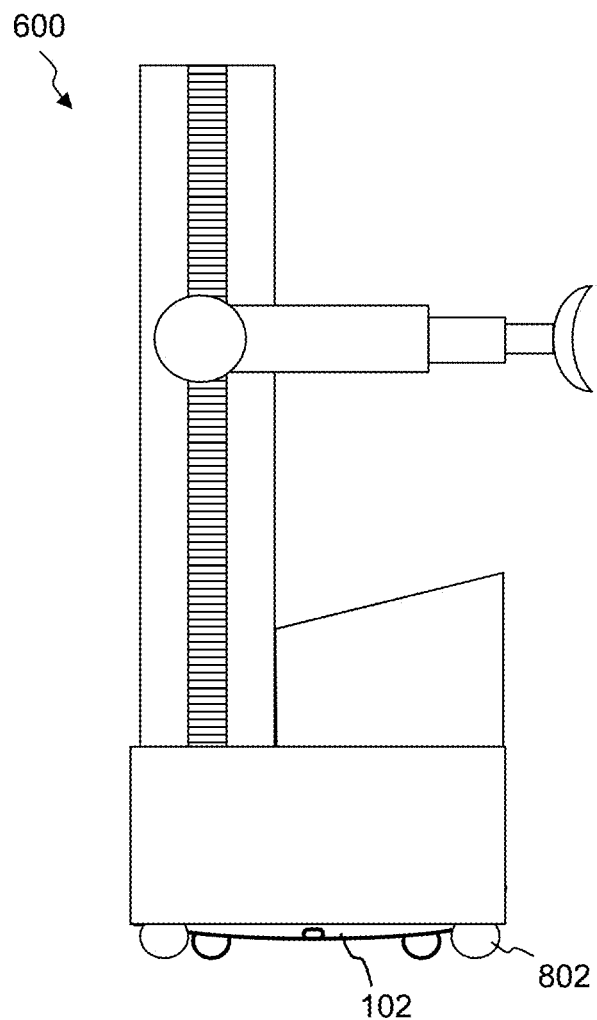
FIG. 8 shows a simplified block diagram of an exemplary product pick unit with a motorized transport unit cooperated with the product pick unit, in accordance with some embodiments.

FIG. 8 shows a simplified block diagram of an exemplary product pick unit 600 with a motorized transport unit cooperated with the product pick unit, in accordance with some embodiments. In this configuration, the product pick unit includes wheels 802. The motorized transport unit, for example, moves itself under the product pick unit 600 and secures with a bar, latch, pole, or other such coupling. The wheels 802 of the product pick unit continue to support the product pick unit while the motorized transport unit pulls the product pick unit to the locations as directed by the central computer system.

Figure 9:
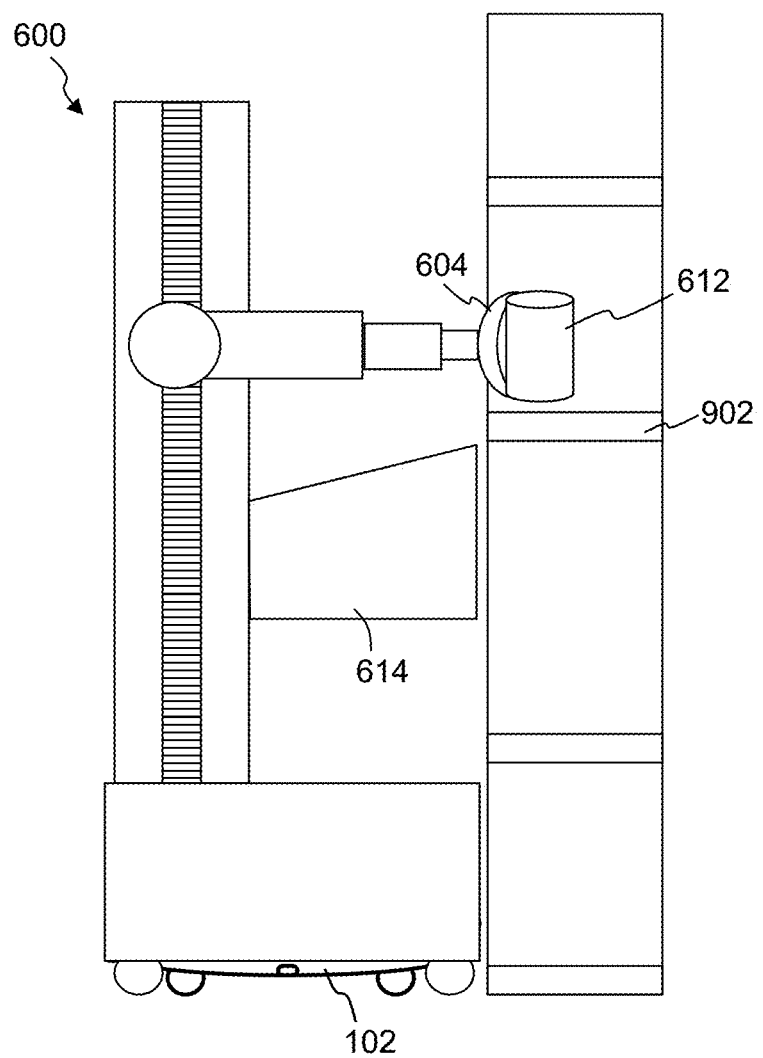
FIG. 9 illustrates a simplified block diagram of a product pick unit, cooperated with a motorized transport unit, with the catch pouch raised to a height proximate a height at which a desired product is positioned, in accordance with some embodiments.

As described above, in some embodiments the catch pouch 614 is raised or lowered to receive the one or more picked products that are retrieved by the product cup system or other product grasping unit (e.g., hook(s), pincher(s), etc.). FIG. 9 illustrates a simplified block diagram of a product pick unit 600, cooperated with a motorized transport unit 102, with the catch pouch 614 raised to a height proximate a height at which a desired product 612 is positioned, in accordance with some embodiments. In some embodiments, the product cup is configured to grasp or otherwise temporarily affix itself to the product 612, and the arm is moved or retracted moving the product off the shelf 902 such that the product is allowed to drop into the catch pouch. Further, the product cup system may not fully support the weight of the product 612 and as such, when the product is pulled from the shelf it automatically drops from the product cup and into the catch pouch. In some implementations, the catch pouch is made of a soft material and/or includes padding to avoid damage to the product 612 and the catch pouch. Still further, the product 612 being retrieved may be fragile and/or the packaging may be fragile. Accordingly, in some embodiments the product catch pouch and/or the containment compartment may include protective packaging into which the product is to be placed. The central computer system can be configured to wirelessly communicate a protection instruction to the product pick unit 600 directing the product pick unit to apply a protective packaging to the first product upon retrieval of the product. The product pick unit may include one or more bubble wrap bags, other similar cushioned bags, roll of bubble wrap, or other such cushioning that the product can be placed into or onto (e.g., while being placed into the catch pouch or into the containment compartment). A packaging arm, air jet or other such mechanism may be included in the product pick unit to open or pull protective packaging.

Figure 10:
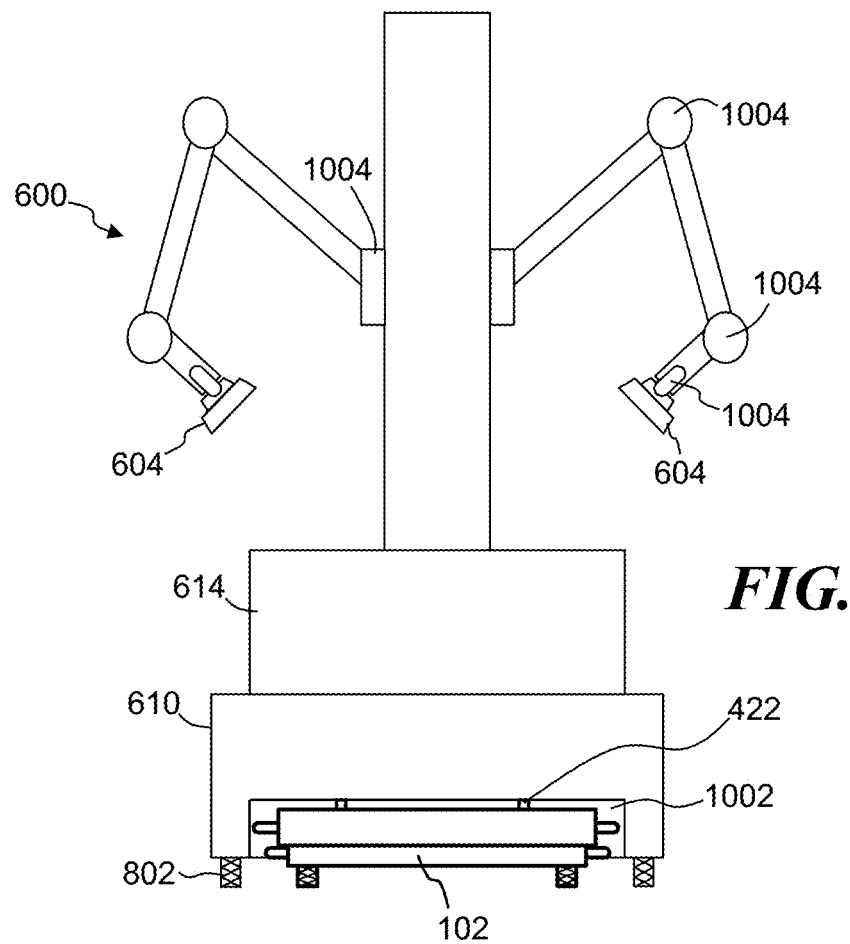
FIG. 10 shows a simplified plane view of a product pick unit cooperated with a motorized transport unit, in accordance with some embodiments.

FIG. 10 shows a simplified plane view of a product pick unit 600 cooperated with a motorized transport unit 102, in accordance with some embodiments. The containment compartment 610 and/or base of the product pick unit includes a motorized transport unit port or recess 1002 into which the motorized transport unit enters to engage and temporarily secure with the product pick unit. In some instances, the motorized transport unit elevates a portion of the motorized transport unit to a height that allows one or more item container coupling structure 422, latches, hooks, or other such structures or combinations of such structures to secure with a bar, post, latch or the like of the product pick unit.

As described above, in some embodiments the product pick unit 600 includes two or more arms 602. In this example, each arm includes multiple arm sections that are cooperated with one or more hinges 1004, joints, sockets, pulleys, cables, motors, other such structures, or combinations of two or more of such structures that allow and provide movement between the sections. The control circuit 706 couples with the one or more motors and/or directs an arm controller of the arm system 710 to control the movement between arm sections and joints to move the product cups to desired locations to cooperate with and retrieve products. Again, one or more vacuum systems 722 may cooperate with the product cups to induce a vacuum force at the product cups. The product cups may have different configurations. For example, one product cup may include a curved exterior surface, while the other cup may have flat surface of a less curved surface. The arms may be used independently or cooperatively. For example, in some instances, a single arm is activated to pick a desired product, while in other instances two or more arms are simultaneously employed to pick a product. The use of one or multiple arms may be dependent on one or more factors, such as but not limited to weight of the product being picked, shape of the product, size of the product, the ability of a cup or other grasper to sufficiently hold or pull the product, and other such factors.

The motorized transport unit 102 receives movement and/or route instructions from the central computer system 106. The central computer system receives requests for one or more products from a customer (e.g., an order submitted via a shopping facility website, through an APP on the customer's user interface unit, or the like). With detailed mappings of the shopping facility and the location of products, including location information of placement of the products on one or more shelves, racks, modules, or other such product support units. In some implementations, the central computer system maintains a three-dimensional (3D) mapping of product placement within the shopping facility. The central computer system may additionally have 3D scans and/or parameters of products. Based on the identification of the one or more products requested by the customer, the central computer system is configured to evaluate location information (e.g., a database is maintained that identifies products and one or more locations within the shopping facility where the product is located, which may include three-dimensional mapping coordinates) and identify a product location. Taking into consideration distance information for the product the product pick unit 600 and the arm system 710 to retrieve the intended product, the central computer system identifies and/or determines routing information and instructions to direct the motorized transport unit to a retrieval location that is proximate the location of the intended product and within a distances that the product pick unit can extend one or more arms 602 to retrieve the intended product. Other factors may be taken into consideration in determining routing. For example, some embodiments identify shortest distances, congestion within the shopping facility, obstacles, the products being retrieved, a current location of a product picking unit, a location where the products are to be delivered by the product pick unit, and other such factors. In some embodiments, the central computer system identifies two or more products requested by the customer order and determines routing through the shopping facility along which the motorized transport unit is to transport the product pick unit to acquire the two or more products such that damage to a first product of the two or more products does not occur from the retrieval of another of the two or more products. This can include, for example, identifying that a first product has glass packaging and a second product is a relatively heavy metal can. As such, the central computer system may providing routing and direct the motorized transport unit and the product pick unit to initially retrieve the can, then retrieve the first product so that the can is less likely to break the glass packaging of the first product. As other examples, routing information may direct the motorized transport unit to retrieve heavier product before retrieving lighter products; retrieving items that are more likely to be damages (e.g., bread, eggs, etc.) after other products are retrieved.

Other factors may be considered in determining routing and an order for picking products. Typically, the central computer system considers the dimensions and weight of products, as well as the dimensions and/or weight relative to a capacity of the catch pouch 614, containment compartment, and/or one or more storage boxes, bags, or the like in the containment compartment. The routing can be dependent on available capacity and ability to place products within the catch pouch, containment compartment and/or storage box, bag, etc. For example, the central computer may direct different product pick units to pick up different products because the dimensions of the products prevent a single product pick unit from maintaining the products.

In some embodiments, the central computer system further determines a number and/or types of storage boxes, bags or other such containers that are to be used to retain and/or deliver the products. For example, the central computer system considers the dimensions of products relative to dimensions of storage containers. Further, the central computer system can further take into consideration, based on temperature thresholds for requested products, whether separate storage containers are needed for different temperatures (e.g., number of containers for ambient temperature products, chilled products, frozen products, heated products, etc.), and in relation to dimensions of the products and the corresponding storage containers. The central computer system may further determine whether sufficient containers and storage space are available to complete the order.

The route information and/or instructions are communicated to the motorized transport unit 102 that is coupled with a product pick unit 600. In some instances, the central computer system further communicates instructions to the product pick unit that are to be implemented by the arm system to retrieve the product. Additionally or alternatively, the pick product unit may be provided with coordinate information that used by the control circuit 706 and/or the arm system 710 to move the one or more product cups or other product grasper to retrieve the intended product.

The motorized transport unit transports the product pick unit to the retrieval location proximate the product. The product pick unit receives the instructions to be implemented to retrieve the product. Sensor data from the product pick unit 600, the motorized transport unit 102, and/or other information (e.g., video from fixed shopping facility cameras, RFID sensors placed throughout the shopping facility, etc.) is typically received at the central computer system and used to confirm and adjust movements of both the motorized transport unit and the product pick unit in retrieving the product. For example, an image and/or video data captured by a camera on the product pick unit (e.g., mounted on, in and/or adjacent a product cup, on the support column 618, or the like) is communicated from the product pick unit to the central computer system. As another example, the product pick unit may be configured to include one or more optical code readers that can be used to scan optical codes on the shelf, rack or the like, the products and other such optical codes. This sensor information is utilized by the central computer system to issue command instructions in directing the motorized transport unit and/or the product pick unit in accurately retrieving an intended product. Additionally or alternatively, the control circuit 706 of the product pick unit 600 can be configured to be provided with product location coordinate information (e.g., three-dimensional coordinates based on the three-dimensional mapping of at least portions of the shopping facility and product placement on shelves, bins, and/or other such storage units), an image of the intended product, a 3D scan of the product, optical code information of the product, and/or other such information. The control circuit 706 receives sensor data (e.g., video data, motion sensor data of movement of the arms and arm segments (e.g., joints, gears, cables, etc. may be indexed and movement tracked in accordance with the precision of the indexing), optical code information, and/or other such information) allowing the control circuit to in part autonomously adjust movements of the arms 602 and placement of the product cups to align with and retrieve the intended product. For example, the control circuit 706 and/or central computer system may use image data to accurately identify the product of interest on a shelf, and based on previous movements of the motorized transport unit and/or the arms 602 can determine a location of the product, and determine subsequent movements to accurately position the product cups.

Figure 11:
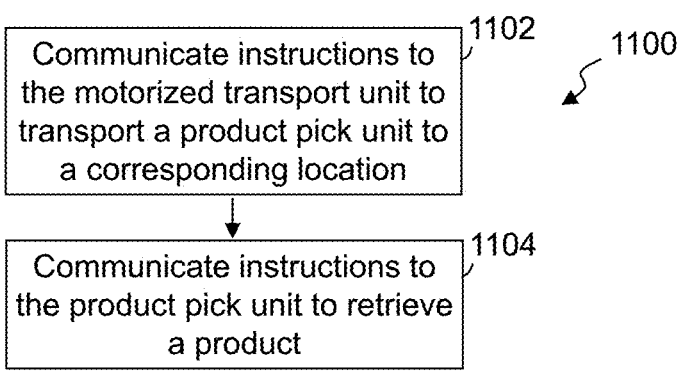
FIG. 11 shows a simplified flow diagram of an exemplary process of fulfilling a customer order through the control of one or more motorized transport units and one or more product pick units, in accordance with some embodiments.

FIG. 11 shows a simplified flow diagram of an exemplary process 1100 of fulfilling a customer order through the control of one or more motorized transport units 102 and one or more product pick units 600, in accordance with some embodiments. As described above, in some implementations the central computer system is in communication with multiple self-propelled motorized transport units that configured to move through at least a portion of a shopping facility that workers and customers regularly enter and travel to locate products. Further, the central computer system is in communication with a plurality of product pick units (PPU) 600 that are each configured to temporarily and removably cooperate with multiple and in some instances any one of the multiple motorized transport units. In part because of the human traffic in areas where the motorized transport units are to travel, care must be taken to maintain control over the multiple motorized transport units and the product pick units. This control includes control in having the motorized transport units and product pick units retrieve products, as well as controlling the motorized transport units to perform other tasks, such as transport carts, assist customers, implement a clean-up, and other such tasks.

In step 1102, one or more instructions are wired or wireless communicated to one or more motorized transport units 102 directing the one or more motorized transport units to transport one or more product pick units 600 to corresponding locations within the shopping facility proximate to where products, which are identified in a customer's order, are located. The one or more instructions may include route instructions, optical code information that define a location, LED light identifier information, specific dimensions (e.g., length of travel, angle of turn, etc.), other such instructions, and often combinations of two or more of such instructions.

Typically, an order for a customer is received that requests one or more products to be acquired from the shopping facility. The order may be provided via a user interface unit (e.g., an APP on a customer's smartphone, tablet, etc.), received through a user interface accessible to a customer through the Internet (e.g., a website corresponding to the shopping facility, a chain of shopping facilities, etc.), received through a kiosk at the shopping facility or other remote site, entered by a shopping facility worker (e.g., in response to a customer calling in an order), and other such sources. The order typically provides a particular identifier of the product requesting to be purchased.

The locations within the shopping facility are determined where each of the one or more products from the customer's order is located within the shopping facility. For example, a database may be maintained with location information for products within the shopping facility. The location data may be entered by a shopping facility employee; entered through received optical code information (e.g., product bar code may be scanned as a worker is stocking the product and GPS and other information may be used to determine a location); a motorized transport unit may provide video, images, optical code or other product identifier information, and the product location information may be determined based on the location of the motorized transport unit and the identification of the product; and other such methods. Further, the desired product may be located at multiple locations within the shopping facility. As such, the central computer system may identify a preferred location and direct the motorized transport unit to that preferred location to pick the product. One or more rules and/or priorities may be applied to different locations. For example, in some instances, the product may be located on the sales floor (e.g., on one or more shelves, bins, racks, etc.); in a back storage area or room (e.g., in case quantities); in the back storage area in open or broken cases (e.g., sales floor could not receive full case (sometimes referred to as "eaches" and/or places in WACO bins), products are pulled from a shelf, etc.); and/or other locations. Further, some back storage areas and/or sales floors use storage shelves, bins, racks, etc. that are moveable in order to conserve space, and one or more may need to be moved in order to facilitate access to the storage location of a product. Accordingly, the central computer system may evaluate the locations of the products and determine from which location a product should be retrieved. The determination may be based on a priority, based on the product or number of a product requested, and the like. For example, some embodiments may attempt to pick items from the sales floor as these are typically the oldest product and not in cases, which allows easier access. In other instances, it may be desirable to pick from the back storage area so as to limit interaction and/or interference of customers on the sales floor. Further consideration of a time of day, customer traffic and other such factors can be evaluated in determining from which location a product is to be picked (e.g., when it is a high customer traffic time, back area picks may have priority over sales floor picks). In other instances, picking from WACO boxes containing only the target product might be designated a most preferred location or highest priority, picking from WACO boxes with mixed products at might set as second preferred location, picking from the sales floor may be a third preferred location or priority, and picking from case pack storage in a back storage area as a fourth or lowest preferred location or priority.

In step 1104, one or more instructions are communicated to each of the one or more product pick units respectively directing the product pick units to retrieve one or more products. The instructions can include, for example, arm movement instructions (e.g., arm elevation instructions along the one or more tracks 608, extension and/or retraction instructions, indexing identifiers, and the like), vacuum system instructions (e.g., activate, deactivate, vacuum force level, etc.), pouch system instructions (e.g., elevation of catch pouch 614, whether to release product from the catch pouch, whether to activate protective packaging, etc.), instructions to control and/or receive sensor information (e.g., video content, images, distance measurements, LED light identifiers, etc.), and other such instructions.

In issuing instructions to retrieve products, the central computer system may identify or determine whether a product pick unit is available, and whether a motorized transport unit is already cooperated with the product pick unit. Similarly, it can be determined whether the available product pick unit is appropriate to retrieve a particular product (e.g., the pick unit is with a threshold distance of the product, the pick unit includes a temperature control system and/or temperature controlled portion of the containment compartment when the product is to be maintained at a threshold temperature, the pick unit has product cups consistent with the product and/or a vacuum system that provides sufficient force to retrieve the product from its storage location, the pick unit has an alternative product grasping unit (e.g., a hook to retrieve products having a weight greater than a threshold weight), and other such factors and characteristics).

When a product pick unit that is available is not already cooperated with a motorized transport unit, the central computer system can identify an available motorized transport unit, which again may be based on one or more factors such as, but not limited to, location of the motorized transport unit relative to the product pick unit, capabilities of the motorized transport unit to cooperate with a product pick unit, and other such factors. The central computer system can communicate a cooperate instruction to the available motorized transport unit 102 to cause the motorized transport unit to move proximate to a corresponding available product pick unit 600, and temporarily cooperate with the a product pick unit such that the motorized transport unit is configured to transport the product pick unit through the shopping facility. Again, the cooperation of the motorized transport unit can be through the item container coupling structure 422 (e.g., a towing system, tow ball, tow pin, tow hook, trailer loop, towing pintle hitch and ring, one or more latches, or other such cooperation methods). In some implementations, the product pick unit may be cooperated with a recharging station, and the motorized transport unit can be directed to travel under the product pick unit and/or into a motorized transport unit port 102 and activate one or more latches or other item container coupling structure 422 to couple with a bar, pin, loop or other such structure of the product pick unit. Once cooperated, the motorized transport unit can transport the product pick unit in accordance with the route and/or direction instructions.

Further, the central computer system, in some implementations further communicates one or more instructions to the product pick unit to adjust a vertical location of the catch pouch 614 relative to a vertical location of the product being retrieved. One or more instructions can be communicated to cause the control circuit 706 to activate one or more vacuum systems 722 and move the vacuum cup to grasp one or more products through a vacuum suction force and deposit the one or more products into the catch pouch. Further, the central computer system may communicate a command to cause the product pick unit to activate the arm system, a track system or other such system to vertically position one or more vacuum cup systems to grasp the intended product through vacuum suction forces and cooperatively retrieving the product.

As introduced above, some embodiments provide protective packaging. The central computer can, in some instances, wirelessly communicate a protection instruction to the product pick unit that directs the product pick unit to apply the protective packaging to the product upon retrieval of the product. In response, the product pick unit can open a protective bag (e.g., directing one of the arms 602 to open the bag, using a pulse or sustained stream of air, or the like), a sheet of packaging material may be retrieved from a storage location, or other such packaging. Further, some embodiments take into consideration other products to be retrieved by the product pick unit in determining routing of the motorized transport unit and the product pick unit. In some instances, the central computer system determines routing through the shopping facility along which the motorized transport unit is to transport the product pick unit to acquire multiple products such that damage to one or more products does not occur from the retrieval of other products.

The central computer system and/or the control circuit 406 of the motorized transport unit may adjust the routing of the motorized transport unit based on sensor data received from sensors of the motorized transport unit, the product pick unit, and the shopping facility. Additionally, in some implementations with the cooperation of the product pick unit, one or more sensors of the motorized transport unit may be blocked or otherwise may be ineffective. As such, in some implementations, the central computer system may receive sensor data corresponding to one or more different sensors of the product pick unit that are configured to sense different conditions, determine routing information for the motorized transport unit based on the received sensor data from the one or more different sensors of the product pick unit instead of sensor data from one or more sensors on the motorized transport unit that are inhibited due to the cooperation of the first motorized transport unit with the first product pick unit.

Some embodiments may route more than one product pick unit in retrieving products for a product order. Similarly, more than one product pick unit, each cooperated with a separate motorized transport unit, can simultaneously be operating through the shopping facility to fulfill a single product order, or fulfill multiple different product orders for one or more different customers. The multiple product pick units can be used to access different parts of the shopping facility to retrieve different products for a single customer order or multiple different customer orders.

The central computer system may further route the multiple motorized transport units and product pick units to deposit the retrieved products at one or more order collection or assembly locations at the shopping facility. In some implementations, for example, the central computer system may communicate an instruction to multiple different motorized transport units and direct the motorized transport units to transport respective product pick units to different locations within the shopping facility proximate to where respective different products are located. Instructions can be communicated to respective product pick units cooperated with the different motorized transport units and direct the product pick units to retrieve respective different products. Further instructions can be communicated, in some instances, to each of the motorized transport units directing the motorized transport units to travel and transport the respective product pick units to a collection location within the shopping facility. The central computer system may additionally communicate instructions to the product pick units to allow the products picked by the product pick units to be collected at one the collection location, and in some instances collected as at least part of fulfilling one or more customers' orders. This allows multiple product pick units to be utilized, and in some instances simultaneously utilized, to obtain products that can then be gathered or otherwise collected in assembling at least part of a single customer order. Again, some products may have different storage needs, such as temperature storage thresholds, such that a portion of the customer order is maintained in different collection locations and assembled at a time the customer arrives at the shopping facility or the order is to be shipped, moved or delivered.

In some instances, multiple product pick units may be deployed to obtain different products as part of a method to protect products (e.g., one or more fragile products may be picked by a first product pick unit, while one or more other non-fragile products are picked by a second product pick unit). As another example, a first product pick unit may include a temperature control system and/or temperature controlled portion of the containment compartment. As such, in some implementations, instructions can be wirelessly communicated to a first motorized transport and directing the first motorized transport unit to transport a first product pick unit having a temperature control system and/or temperature controlled portion of the containment compartment to one or more locations within the shopping facility proximate to locations where one or more products are located and have temperature thresholds or requirements that are different than other products (e.g., must be maintained at a temperature below 32° F.). Further instructions can be communicated to the product pick unit directing the product pick unit to retrieve the one or more products having the temperature thresholds. Once retrieved, one or more route instructions can be wirelessly communicated to the motorized transport unit to transport the product pick unit and the temperature dependent products to a temperature control area of the shopping facility (e.g., a refrigerated section, a freezer section, a heated area, etc.), or otherwise taking to a worker to allow the worker to move the product to a relevant temperature controlled storage location.

Upon completion of the picking and fulfillment of a product order, the central computer system may direct the motorized transport unit 102 to return a product pick unit 600 to a recharge station. Similarly, the product pick unit may notify the central computer of a power level, and when within a power threshold the central computer system may direct the motorized transport unit to take the product pick unit to a recharge station. The recharge stations for the pick unit may be the same or different than the recharge stations or docking station 122 for the motorized transport unit. In some instances, the recharge station may be configured to simultaneously recharge both a product pick unit and a motorized transport unit.

In some embodiments, apparatuses and methods are provided herein useful to fulfill customer orders. In some embodiments, a system comprises: a first self-propelled motorized transport unit configured to move through at least a portion of a shopping facility that is configured such that customers regularly enter and travel through at least a sales floor portion of the shopping facility to locate and purchase products from the shopping facility; a first product pick unit (PPU) configured to temporarily and removably cooperate with the motorized transport unit; a wireless communication network; and a central computer system that is separate from the motorized transport unit and the product pick unit, wherein the central computer system comprises: a transceiver; a control circuit coupled with the transceiver; and a memory coupled to the control circuit and storing computer instructions that when executed by the control circuit cause the control circuit to: wirelessly communicate an instruction to the first motorized transport unit and direct the first motorized transport unit to transport the first product pick unit to a determined first location within the shopping facility proximate to where a first product having been ordered is located; and wirelessly communicate an instruction to the first product pick unit cooperated with the first motorized transport unit and direct the first product pick unit to retrieve the first product.

In some embodiments, a method of fulfilling a customer order comprises: by a control circuit: wirelessly communicating an instruction to a first motorized transport unit, which is separate from the control circuit, directing the first motorized transport unit to transport a first product pick unit to a determined first location within a shopping facility proximate to where a first product having been ordered is located, wherein the first product pick unit is configured to temporarily and removably cooperate with the first motorized transport unit; and wirelessly communicating an instruction to the first product pick unit cooperated with the first motorized transport unit and directing the first product pick unit to retrieve the first product.

In some embodiments, apparatuses and methods are provided herein useful to fulfill customer orders. In some embodiments, an apparatus comprises multiple self-propelled motorized transport units configured to move through at least a portion of a shopping facility that is configured such that customers regularly enter and travel through at least a shopping floor portion of the shopping facility to locate and purchase products from the shopping facility; a plurality of product pick units each configured to temporarily and removably cooperate with any one of the multiple motorized transport units; a wireless communication network; and a central computer system that is separate and distinct from the multiple motorized transport units and the plurality of product pick units, wherein the central computer system is configured to communicate with each of the multiple motorized transport units and the plurality of product pick units via the wireless communication network, wherein the central computer system comprises: a transceiver configured to communicate with the multiple motorized transport units and the plurality of product pick units located at the shopping facility; a control circuit coupled with the transceiver; and a memory coupled to the control circuit and storing computer instructions that when executed by the control circuit cause the control circuit to: receive an order for a customer requesting one or more products to be acquired from the shopping facility; determine locations within the shopping facility where each of the one or more products from the order is located within the shopping facility; wirelessly communicate an instruction to a first motorized transport unit and direct the first motorized transport unit to transport a first product pick unit of the plurality of product pick units to a first location within the shopping facility proximate to where a first product is located; and wirelessly communicate an instruction to the first product pick unit cooperated with the first motorized transport unit and direct the first product pick unit to retrieve the first product.

In some embodiments, a method of fulfilling a customer order comprises: by a control circuit: receiving an order for a customer requesting one or more products to be acquired from a shopping facility that is configured such that customers regularly enter and travel through at least a shopping floor portion of the shopping facility to locate and purchase products from the shopping facility; determining locations within the shopping facility where each of the one or more products from the order is located within the shopping facility; wirelessly communicating an instruction to a first motorized transport unit, of multiple self-propelled motorized transport units at the shopping facility that are separate and distinct from the control circuit, directing the first motorized transport unit to transport a first product pick unit of a plurality of different product pick units to a first location within the shopping facility proximate to where the first product is located, wherein each of the plurality of product pick units are configured to temporarily and removably cooperate with any one of the multiple motorized transport units; and wirelessly communicating an instruction to the first product pick unit cooperated with the first motorized transport unit and directing the first product pick unit to retrieve the first product.

The retail industry is changing. There is a desire from business perspectives to fulfill some customer orders from existing brick and mortar shopping facilities. This may be due to a variety of reasons such as, but not limited to, there is too much inventory in a store near the ultimate destination; there may be too little inventory in one or more existing distribution or other fulfillment centers; perishable goods may be involved; the cost or time to deliver from the shopping facility is preferable, and other such reasons. Accordingly, some embodiments utilize the central computer system controlling the product pick units in cooperation with the motorized transport units to automate and expedite the assembly and fulfillment of an order from existing items. The use of the motorized transport units and the product pick units allows fulfillment of orders by picking the products for customer orders from shopping facility shelves, bins and the like. This fulfilling provides a great opportunity to leverage existing local facilities and quickly deliver merchandise from the shopping facility location that are near to the customer and in potentially a more efficient manner for at least some products. Further, the automated fulfillment may free up workers allowing them to spend more time helping in facility customers. Further, the motorized transport units and product pick units can continuously work on order fulfillment during day and night.

The central computer system can evaluate and consider a variety of attributes when determining which items are in an order, which are to be picked, which are to be picked by which product pick unit, an order of picking, and the like. For example, the temperature storage thresholds of one or more products (e.g., ambient or room temperature, chilled, frozen, heated, etc.) may be considered. Further, the central computer system typically further considers dimensions (e.g., height, width, depth, weight) of products. In some instances, the central computer system further considers deformability, fragility and stackability of the products, which may further be considered in both case and individual quantities. As described above, the locations in which the products are located, including both case and individual quantities can also be considered in determining routing and/or the picking of products. Still further, some implementations consider the ways in which a product might be identified (e.g., barcode, RFID tag, QR code, digital watermarking, visual inspection), in determining routing and/or which product pick unit is to retrieve the product.

There are many different potential factors that are taken into account in determining a route one or more motorized transport units are to take in transporting relevant product pick units in acquiring one or more desired products. Typically, the central computer system considered a combination of two or more factors in determining routes of the one or more motorized transports unit are to take in retrieving the one or more requested products and/or whether more than one motorized transport unit is to be utilized. Some of the factors include, but are not limited to, product weights, product sizes, product dimensions, products frangibility, location within the shopping facility, whether the product can be acquired from more than one location within the shopping facility and locations from which to choose for each product (e.g., a priority scheme may be defined, for example, first from a pick unit pick bin, second the sales floor, back room, etc., which may also be further dependent on number of products at a location, expiration dates, etc.), location of desired products relative to each other, customer traffic and/or congestion in areas of the shopping facility that the motorized transport unit and product pick unit are to travel (the congestion can include customer traffic, worker traffic, work being performed by workers, other devices being used (e.g., cleaning equipment, construction equipment, etc.), and the like), current short term and long term obstacles (e.g., obstructions (temporary or permanent) between a motorized transport unit and potential locations of desired products), temperatures at which products should be maintained, numbers of products to be retrieved, whether a single product pick unit can be utilized to acquire multiple products for more than one customers' orders, destination storage location for each product and/or each product storage container (e.g., ambient, chilled, frozen and/or heated storage locations) after product retrieval, and other such factors.

As introduced above, in some instances, the central computer system may direct a product pick unit to pick products from multiple different orders during a single pick process. For example, three different orders may have each requested a gallon of the same kind of milk. Accordingly, the central computer system may direct a product pick unit to retrieve three different gallons of the requested milk at the same time. Once acquired, the retrieved products may be subsequently separated into the different orders. The separation may be performed by a worker in compiling the relevant customer orders; a packaging system that places products into one or more storage boxes, bags, bins, crates; or other such separation process.

In some embodiments, the central computer system may further take into consideration and/or determine how an order is to be delivered to a customer. The fulfillment to a customer might be through one of many ways, such as but not limited to: pickup by the customer in the shopping facility or other pick-up location; shipment from the shopping facility to a customer specified delivery location (e.g., third party carrier, or the like); direct delivery from the store to the customer (e.g., through a shopping facility delivery service), or other such delivery methods. One or more delivery processes are typically followed depending on the intended mode of delivery. For example, when a customer is scheduled to pick up the ordered one or more products at the shopping facility, a two-step process may include: the collection or assembly of the order into one or more storage containers at one or more storage locations (e.g., based on temperature storage restrictions, item size, number of items, expected pickup date and time, etc.); and, the collection of the storage containers and delivery to the customer pickup location once the customer has arrived. Some embodiments similarly utilize one or more product pick units in collecting some or all of the one or more storage containers in gathering the customer order. Similarly, when a customer is scheduled to pick up an order at a separate location, a three-step process may be utilized: the assembly of the order into one or more storage containers into one or more storage locations (e.g., based on temperature storage restrictions, item size, etc.); transporting of those storage containers to the scheduled separate pickup location equipped with similar storage locations (which may include a multiple step process, such as one or more steps of collecting the products of an order and delivery to one or more transport locations at the shopping facility, some embodiments may package or encapsulate some temperature dependent products (e.g., encapsulate chilled or frozen products in shipping containers with sufficient insulation, cooling and/or heating capability may be a consideration), labeling and/or otherwise distinguishing products and/or storage containers for a particular customer order, transporting the products to the scheduled pickup location, and depositing the storage containers to relevant temporary storage locations); and, the collection of the storage containers and delivery to the customer pickup location once the customer has entered the separate location. When the product order is to be shipped, some embodiments implement a similar process as delivery to a separate pickup location. The process typically includes labeling the shipping container(s) with customer delivery location information and/or customer identifying information. Again, some implementations include packaging and/or encapsulating one or more temperature restricted products into relevant packaging or shipping containers (e.g., chilled, frozen and/or heated items may be placed in shipping containers with sufficient insulation, cooling and/or heating capability). When products are delivered to a delivery site additional scheduling may be determined to move the various storage containers to the delivery vehicle and coordination of deliver schedules with other deliveries.

The customer orders may be received through one or more sources, such as through a web page providing an on-line order, through an APP on a customer's user interface unit, through a kiosk at the shopping facility, or other such sources. As another example, some embodiments in preforming the automated product order fulfillment implement one or more of the steps of the following process. Some embodiments place the order into an order queue, which may be based on some priority (e.g., customer may be a preferred customer and put ahead of other customers). Further, some embodiments evaluate the order in determining one or more shopping facility locations from which the one or more products of the order are to be retrieved. The relevant shopping facilities are notified of the product order and the relevant products to be acquired. The placement in queue and/or priority may also be provided. Upon receiving an order the central computer system (CCS) typically enriches the order description with relevant information, such as product location within the shopping facility where the product is to be picked, shelve location etc.; create, schedule and/or communicate a collection task for one or more product pick units for fulfilling the online order; and the like. The central computer system creates, schedule and/or communicate a cooperation task and/or notification to one or more motorized transport units to cooperate and transport relevant product pick units. The relevant motorized transport units cooperate with relevant product pick units, when not already cooperated. In some instances, the motorized transport unit transports the product pick unit to a storage container area (e.g., a backroom of the shopping facility to acquire one or more storage containers, protection packaging, etc. The storage container and/or packaging acquired may have specified dimensions (e.g., based on the one or more products to be picked for the order) and positioned in the containment compartment 610, the catch pouch 614, or otherwise positioned to receive the products once picked. The placement of the storage container and/or packaging material typically utilizes one or more sensors, image processing, arms 602, external arms, conveyors, and/or other such mechanisms.

The motorized transport unit then transports the product pick unit following a predefined path to travels to the one or more specified shelves and a specified location proximate to the product location where picking task is to be started. In some implementations, one or more sensors (e.g., image capture systems, bar code reader (e.g., which may be cooperated with one or more of the arms 602 and/or product cup system), laser scanning, and the like) are activated on the product pick unit and/or motorized transport unit to allow the central computer system to identify and/or verify the desired product and its location. The product pick unit is provided instructions and activated to pick the specified product(s) and puts or drops the product into the catch pouch and/or containment compartment. In some implementations, the product is placed at a specified location and/or in a specified orientation in storage container (e.g., using the arms and vacuum cup system or other such grasper system. The picking of a product can be repeated when multiple of the same products are to be retrieved as long as more products are to be picked from the same shelf location for the specified product(s) and there is enough space available for the product(s) in the containment compartment and/or storage container. The central computer system can route the motorized transport unit to one or more other locations within the shopping facility when other products are to be retrieved, and instruct the product pick unit to repeat the above steps to retrieve the desired product(s). Once the pickup of all the products that the product pick unit is to pick up for the scheduled pick up task instance (e.g., based on no additional space available in the containment compartment, all products in the order have been picked, etc.) is complete, the motorized transport unit is directed to transport the product pick unit a predefined location (e.g., order staging and/or compilation location, refrigerated location, etc.) and the product and/or product storage container is deposited at the predefined location. The product pick unit may communicate to the central computer system that the pick task has been carried out. In some embodiments, some or all of the actions taken by the motorized transport unit, product pick unit, and/or central computer system may be recorded. For example, sensor information and actions performed by the motorized transport unit and/or product pick unit may be recorded in video form along with a command script generated by the central computer system, motorized transport unit and/or product pick unit. In some implementations, these actions are used by leadership for performance evaluations and analytics.

In some embodiments, the product pick unit 600 includes one or more arms 602 or other such movable structures that are configured to move relevant grasping devices to desired locations. For example, one or more arms may be fixed on a vertical lift for up and down motions, pivot joints may allow one or more sections of an arm to move the grasping device vertical, or other such mechanisms or combinations of such mechanism. Further, the arms typically also telescope, hinge on one or more axis points (e.g., a 360 degree, 180 degree, 90 degree or other such range), or other such movement mechanisms to move horizontally inward and outward. In some instances, one or more arms include a vacuum cup with vacuuming capabilities or other such grasping system for grasping products. One or more other arms may have a different grasping mechanism (e.g., hook, latch, etc.). Different shaped cups may be placed on different arms, a single arm may have multiple cups (e.g., rotationally position a desired one of the cups), and/or the grasping mechanism may be detachable with multiple grasping mechanisms available to a single pick unit. Often, more than one arm are operated together to grab a product, such as products that are multi-shaped. In some embodiments, the product pick unit may include an additional scoop that can be extend and retracted under the vacuum cup to provide stability of the grab. The retrieved product may be placed in the catch pouch, containment compartment, storage container or the like. In other instances, the product may be dropped and/or dragged off a shelf and allowed to drop into the catch pouch. The catch pouch may include a padded and/or safety bumper. When a product is fragile, the product pick unit may position and/or include protection packaging (e.g., a bubble wrap bag may be opened (e.g., through air, an arm 602, etc.) to product and/or surround the product. In some instances, the protection packaging is positioned to allow the product to drop into it and on down into the catch pouch. Once the safety bumper is bumped, the bumper may drop down and allow the product to drop, roll or otherwise be moved into the containment compartment, and typically into a storage container within the containment compartment.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system to fulfill a customer order, comprising:
a first self-propelled motorized transport unit configured to move through at least a portion of a shopping facility that is configured such that customers regularly enter and travel through at least a sales floor portion of the shopping facility to locate and purchase products from the shopping facility;
a first product pick unit (PPU) configured to temporarily and removably cooperate with the motorized transport unit;
a wireless communication network; and
a central computer system that is separate from the motorized transport unit and the first product pick unit, wherein the central computer system comprises:
a transceiver;
a control circuit coupled with the transceiver; and
a memory coupled to the control circuit and storing computer instructions that when executed by the control circuit cause the control circuit to:
wirelessly communicate an instruction to the first motorized transport unit and direct the first motorized transport unit to transport the first product pick unit to a determined first location within the shopping facility proximate to where a first product having been ordered is located;
wirelessly communicate an instruction to the first product pick unit cooperated with the first motorized transport unit and direct the first product pick unit to retrieve the first product; and
wirelessly communicate a protection instruction to the first product pick unit directing the first product pick unit to apply a protective packaging to the first product upon retrieval of the first product.

2. The system of claim 1, wherein the central computer system is further configured to:
wirelessly communicate an instruction to a second motorized transport unit and direct the second motorized transport unit to transport a second product pick unit to a determined second location within the shopping facility proximate to where a second product having been ordered is located;
wirelessly communicate an instruction to the second product pick unit to retrieve the second product;
wirelessly communicate an instruction to each of the first motorized transport unit and the second motorized transport unit directing the first and second motorized transport units to a collection location within the shopping facility; and
communicate an instruction to each of the first product pick unit and the second product pick unit to allow the first product and the second product, respectively, to be collected as at least part of fulfilling the order.

3. The system of claim 1, wherein the central computer system is further configured to wirelessly communicate a cooperate instruction to cause the first motorized transport unit to move proximate to the first product pick unit and temporarily cooperate with the first product pick unit such that the first motorized transport unit is configured to transport the first product pick unit through the shopping facility.

4. The system of claim 1, wherein the central computer system in wirelessly communicating the instruction to the first product pick unit to retrieve the first product is configured to communicate an instruction to the first product pick unit to adjust a vertical location of a catch pouch relative to a vertical location of the first product, and communicate an instruction to activate at least a first vacuum cup system to grasp the first product through a vacuum suction force and deposit the first product into the catch pouch.

5. The system of claim 1, wherein the central computer system in wirelessly communicating the instruction to the first product pick unit to retrieve the first product is configured to communicate an instruction to the first product pick unit to vertically position each of a first vacuum cup system and a second vacuum cup system of the first product pick unit to grasp the first product through vacuum suction forces and cooperatively retrieve the first product.

6. The system of claim 1, wherein the central computer system is further configured to identify two or more products specified in a customer's order, and determine routing through the shopping facility along which the motorized transport unit is to transport the first product pick unit to acquire the two or more products such that damage to the first product of the two or more products does not occur from the retrieval of a second product of the two or more products, wherein the wirelessly communicating the instruction to the first motorized transport unit comprises communicating route information in accordance with the determined routing that is to be implemented by the first motorized transport unit.

7. The system of claim 1, wherein the central computer system further receives sensor data corresponding to multiple different sensors of the first product pick unit that are configured to sense different conditions, and determines routing information for the first motorized transport unit based on the received sensor data from the multiple different sensors of the first product pick unit instead of sensor data from sensors on the first motorized transport unit that are inhibited due to the cooperation of the first motorized transport unit with the first product pick unit.

8. The system of claim 1, wherein the central computer system is further configured to:
  wirelessly communicate an instruction to a second motorized transport and direct the second motorized transport unit to transport a second product pick unit of the plurality of product pick units to a second location within the shopping facility proximate to where a second product is located, wherein the second product has a temperature requirement different than that of the first product;
  wirelessly communicate an instruction to the second product pick unit cooperated with the second motorized transport unit and direct the second product pick unit to retrieve the second product; and
  wirelessly communicate one or more route instructions to the second motorized transport unit to transport the second product pick unit and the second product to a temperature control area of the shopping facility.

9. The system of claim 1, wherein the first product pick unit comprises a containment compartment adjacent a release of the catch pouch, and a pouch control system coupled with the release that controls the opening and closing of the release to allow the first product deposited into the catch pouch to be transferred to a storage container temporarily positioned within the containment compartment and subsequently used in delivering the first product to a customer requesting the first product.

10. The system of claim 1, wherein the first motorized transport unit comprises a communication coupling configured to communicatively couple with a communication coupling of the first product pick unit, wherein the central computer system is configured to communicate instructions to the first product pick unit through the first motorized transport unit relaying instructions wirelessly received at the first motorized transport unit from the central computer system to the first product pick unit.

11. The system of claim 10, wherein the first motorized transport unit comprises a power coupling configured to couple with a power coupling of the first product pick unit, and wherein the first motorized transport unit is configured to supply power to the first product pick unit.

12. The system of claim 1, wherein the first motorized transport unit comprises a power coupling configured to couple with a power coupling of the first product pick unit, and wherein the first motorized transport unit is configured to supply power to the first product pick unit.

13. A method of fulfilling a customer order, comprising:
  by a control circuit:
  wirelessly communicating an instruction to a first motorized transport unit, which is separate from the control circuit, directing the first motorized transport unit to transport a first product pick unit to a determined first location within a shopping facility proximate to where a first product having been ordered is located, wherein the first product pick unit is configured to temporarily and removably cooperate with the first motorized transport unit;
  wirelessly communicating an instruction to the first product pick unit cooperated with the first motorized transport unit and directing the first product pick unit to retrieve the first product; and
  wirelessly communicating a protection instruction to the first product pick unit directing the first product pick unit to apply a protective packaging to the first product upon retrieval of the first product.

14. The method of claim 13, further comprising:
  wirelessly communicating an instruction to a second motorized transport unit and direct the second motorized transport unit to transport a second product pick unit to a determined second location within the shopping facility proximate to where a second product having been ordered is located;
  wirelessly communicating an instruction to the second product pick unit to retrieve the second product;
  wirelessly communicating an instruction to each of the first motorized transport unit and the second motorized transport unit directing the first and second motorized transport units to a collection location within the shopping facility; and
  communicating an instruction to each of the first product pick unit and the second product pick unit to allow the first product and the second product, respectively, to be collected as at least part of fulfilling the order.

15. The method of claim 13, further comprising:
  wirelessly communicating a cooperate instruction to cause the first motorized transport unit to move proximate to the first product pick unit and temporarily cooperate with the first product pick unit such that the first motorized transport unit is configured to transport the first product pick unit through the shopping facility.

16. The method of claim 13, wherein the wirelessly communicating the instruction to the first product pick unit to retrieve the first product comprises:
  communicating an instruction to the first product pick unit to adjust a vertical location of a catch pouch relative to a vertical location of the first product, and communicating an instruction to activate at least a first vacuum cup system to grasp the first product through a vacuum suction force and deposit the first product into the catch pouch.

17. The method of claim 13, wherein the wirelessly communicating the instruction to the first product pick unit to retrieve the first product further comprises communicating an instruction to the first product pick unit to vertically position each of a first vacuum cup system and a second vacuum cup system of the first product pick unit to grasp the first product through vacuum suction forces and cooperatively retrieving the first product.

18. The method of claim 13, further comprising:
identifying two or more products specified in a customer's order; and
determining routing through the shopping facility along which the motorized transport unit is to transport the first product pick unit to acquire the two or more products such that damage to the first product of the two or more products does not occur from the retrieval of a second product of the two or more products;
wherein the wirelessly communicating the instruction to the first motorized transport unit comprises communicating route information in accordance with the determined routing that is to be implemented by the first motorized transport unit.

19. The method of claim 13, further comprising:
receiving sensor data corresponding to multiple different sensors of the first product pick unit that are configured to sense different conditions, and
determining routing information for the first motorized transport unit based on the received sensor data from the multiple different sensors of the first product pick unit instead of sensor data from sensors on the first motorized transport unit that are inhibited due to the cooperation of the first motorized transport unit with the first product pick unit.

20. The method of claim 13, further comprising:
wirelessly communicating an instruction to a second motorized transport and directing the second motorized transport unit to transport a second product pick unit of the plurality of product pick units to a second location within the shopping facility proximate to where a second product is located, wherein the second product has a temperature requirement different than that of the first product;
wirelessly communicating an instruction to the second product pick unit cooperated with the second motorized transport unit and directing the second product pick unit to retrieve the second product; and
wirelessly communicating one or more route instructions to the second motorized transport unit to transport the second product pick unit and the second product to a temperature control area of the shopping facility.

* * * * *